(12) United States Patent
Harper

(10) Patent No.: US 10,955,991 B2
(45) Date of Patent: Mar. 23, 2021

(54) INTERACTIVE ICONS WITH EMBEDDED FUNCTIONALITY USED IN TEXT MESSAGES

(71) Applicant: LOJI, LLC, Palm Beach, FL (US)

(72) Inventor: Kathryn L. Harper, Palm Beach, FL (US)

(73) Assignee: LOJI, LLC, Palm Beach, FL (US)

( * ) Notice: Subject to any disclaimer, the term of this patent is extended or adjusted under 35 U.S.C. 154(b) by 0 days.

(21) Appl. No.: 16/413,548

(22) Filed: May 15, 2019

(65) Prior Publication Data

US 2020/0133464 A1    Apr. 30, 2020

Related U.S. Application Data

(63) Continuation of application No. 15/338,120, filed on Oct. 28, 2016, now abandoned.

(60) Provisional application No. 62/249,069, filed on Oct. 30, 2015.

(51) Int. Cl.
*G06F 17/00* (2019.01)
*G06F 3/0481* (2013.01)
*G06F 3/0488* (2013.01)
*H04M 1/725* (2021.01)

(52) U.S. Cl.
CPC ...... *G06F 3/04817* (2013.01); *G06F 3/04886* (2013.01); *H04M 1/72552* (2013.01)

(58) Field of Classification Search
CPC ............ G06F 3/04817; G06F 3/04886; H04M 1/72552
USPC ...................................................... 715/753
See application file for complete search history.

(56) References Cited

U.S. PATENT DOCUMENTS

| | | | |
|---|---|---|---|
| 8,103,547 B2 * | 1/2012 | Mah | G06Q 30/0277 705/14.73 |
| 8,849,931 B2 | 9/2014 | Linner et al. | |
| 8,965,425 B2 | 2/2015 | Daniel et al. | |
| 9,191,713 B2 * | 11/2015 | Burnett | H04N 21/4788 |
| 9,223,461 B1 | 12/2015 | Brown et al. | |
| 9,262,774 B2 | 2/2016 | Tung et al. | |
| 9,495,692 B2 | 11/2016 | Tung et al. | |
| 9,596,200 B1 | 3/2017 | Chen et al. | |
| 2005/0154798 A1 | 7/2005 | Nurmi | |

(Continued)

OTHER PUBLICATIONS

Luor et al., The Effect of Emoticons in Simplex and Complex Task-oriented Communication: An Empirical Study of Instant Messaging, Elsevier 2010, pp. 889-895. (Year: 2010).*

(Continued)

*Primary Examiner* — Cong-Lac Huynh
(74) *Attorney, Agent, or Firm* — One LLP; Joseph K. Liu

(57) ABSTRACT

A method and system for providing emojis, or interactive icons, that have embedded functionality and can be used in text messages or other web based communication. The method and system of interactive icons with embedded functionality can convert a word into an exact logo. The converted logo can have embedded functionality, such as hyperlinks, phone number, using GPS to find locations closest to a user, or opening of a company's app. The interactive icons with embedded functionality may be selected from a keyboard, or from a predictive texting function. They can then be shared or viewed, or selected to provide the embedded information without leaving the messaging application.

18 Claims, 24 Drawing Sheets

(56) References Cited

U.S. PATENT DOCUMENTS

| | | |
|---|---|---|
| 2007/0266090 A1* | 11/2007 | Len .................. G06F 40/103 709/204 |
| 2008/0235285 A1 | 9/2008 | Della Pasqua |
| 2009/0276702 A1 | 11/2009 | Bamford et al. |
| 2012/0290977 A1 | 11/2012 | Devecka |
| 2012/0311462 A1* | 12/2012 | Devecka ................ H04W 4/21 715/753 |
| 2013/0060875 A1 | 3/2013 | Burnett et al. |
| 2013/0159431 A1* | 6/2013 | Berry ..................... H04L 51/08 709/206 |
| 2013/0231143 A1 | 9/2013 | Erskine et al. |
| 2013/0263039 A1 | 10/2013 | Fahlgren et al. |
| 2015/0143260 A1* | 5/2015 | Bailey ................... G06Q 50/01 715/753 |
| 2015/0339615 A1 | 11/2015 | Walkingshaw et al. |
| 2016/0279523 A1 | 9/2016 | Altagar et al. |
| 2016/0357399 A1 | 12/2016 | Shin et al. |
| 2017/0131870 A1* | 5/2017 | Harper ............... G06F 3/04817 |
| 2017/0147182 A1 | 5/2017 | Martinazzi et al. |
| 2017/0193530 A1 | 7/2017 | Newsum et al. |
| 2017/0199637 A1 | 7/2017 | Yasuda et al. |
| 2018/0077096 A1 | 3/2018 | DeMattei |
| 2018/0130094 A1* | 5/2018 | Tung .................. G06F 3/04886 |
| 2018/0295072 A1 | 10/2018 | Yim et al. |
| 2019/0075031 A1* | 3/2019 | Skelton ................ G06F 3/0482 |

OTHER PUBLICATIONS

Wong, et al. "Aesthetics and Virtual Keyboard Designs for PDAs". ACM 2007, pp. 181-186.
WO, PCT/US2016/059555 ISR and Written Opinion, dated Feb. 9, 2017.

* cited by examiner

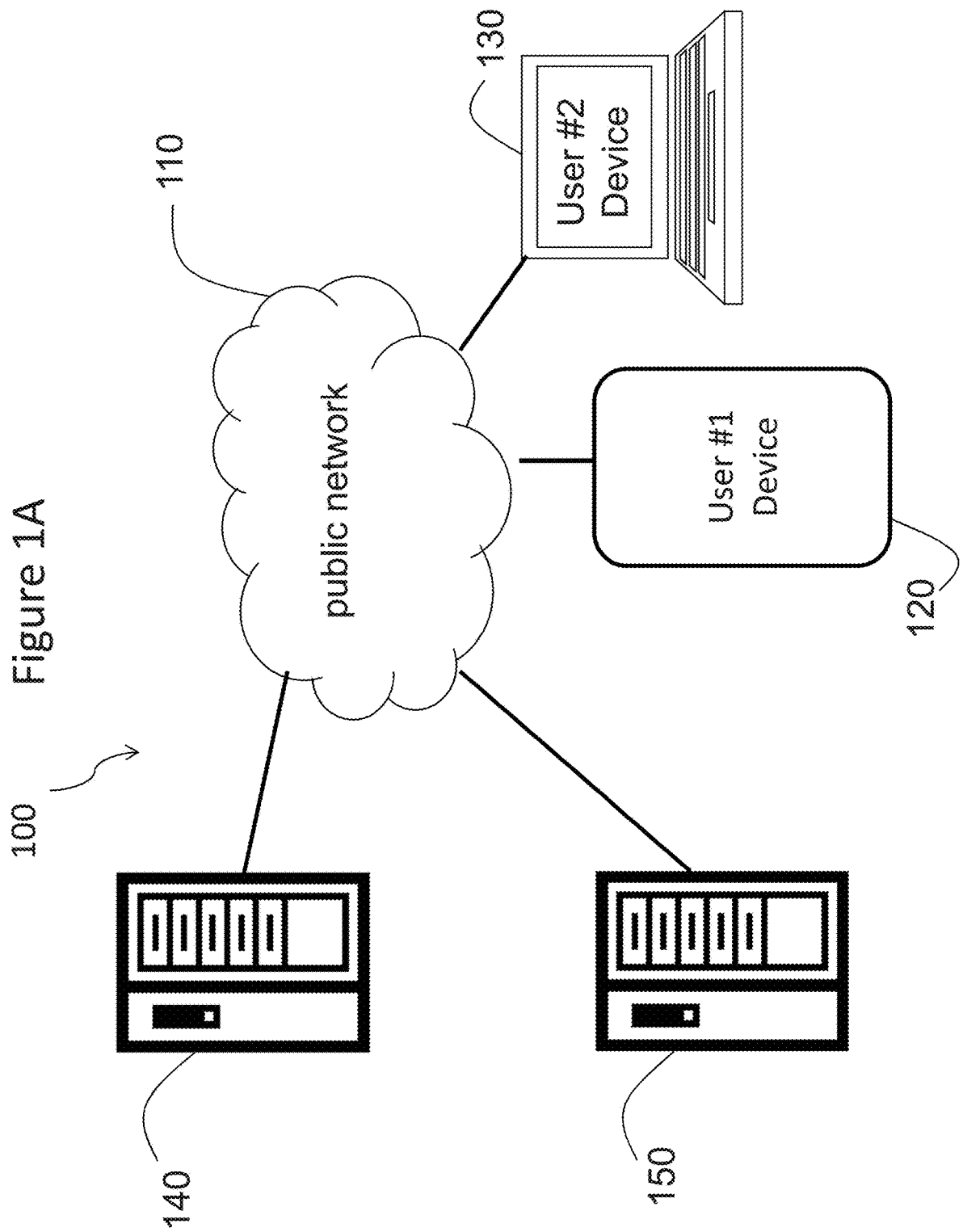

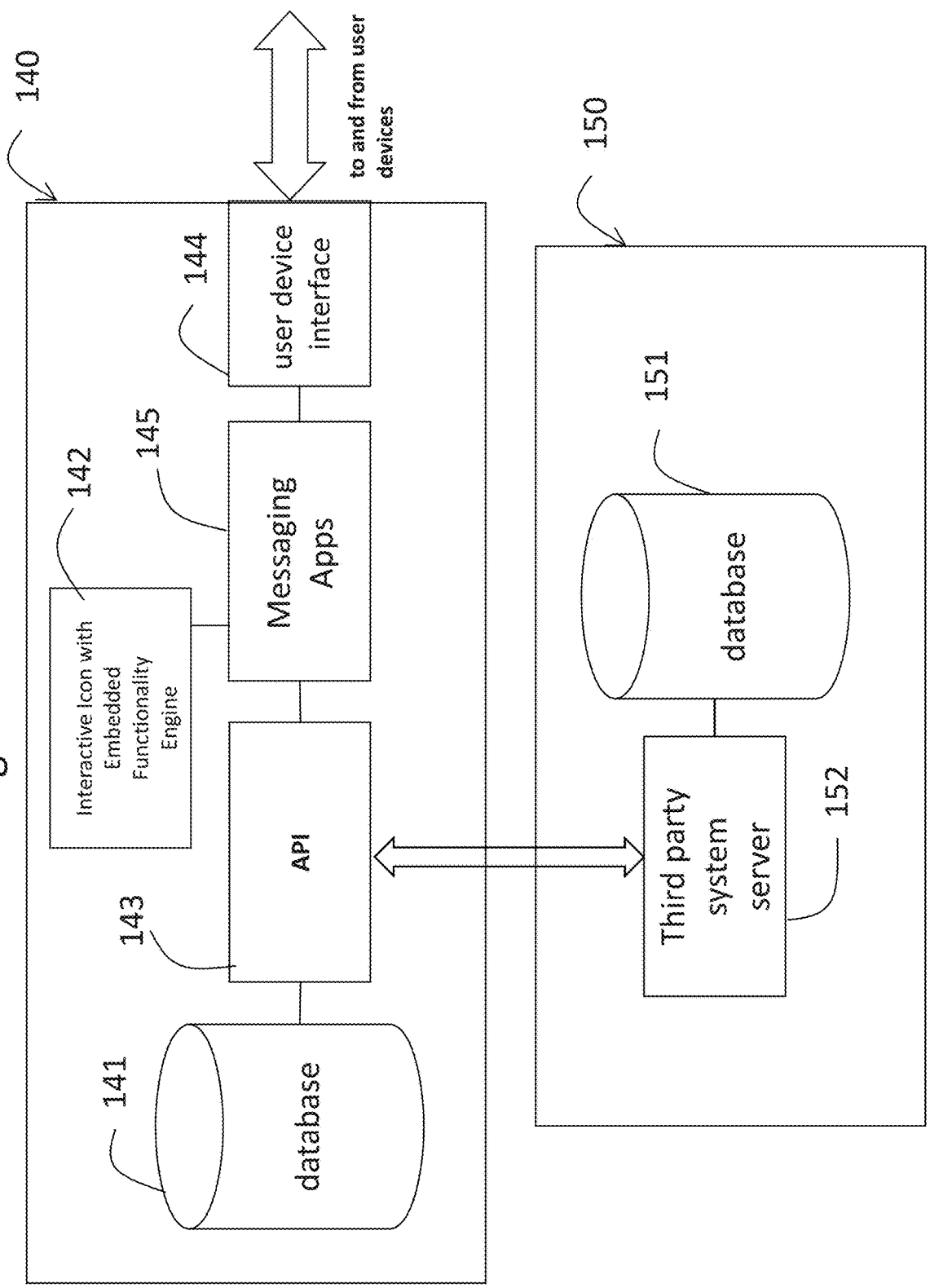

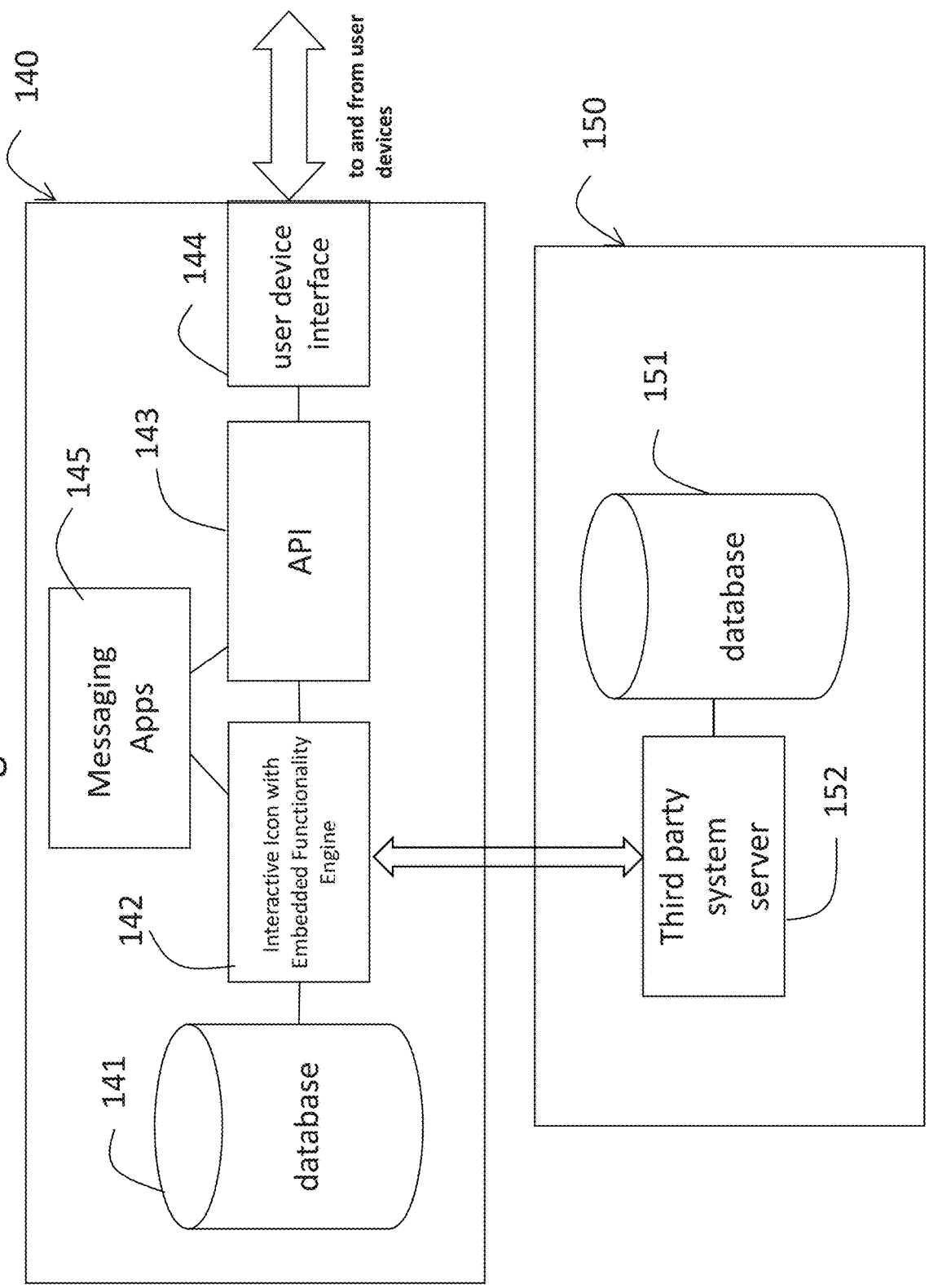

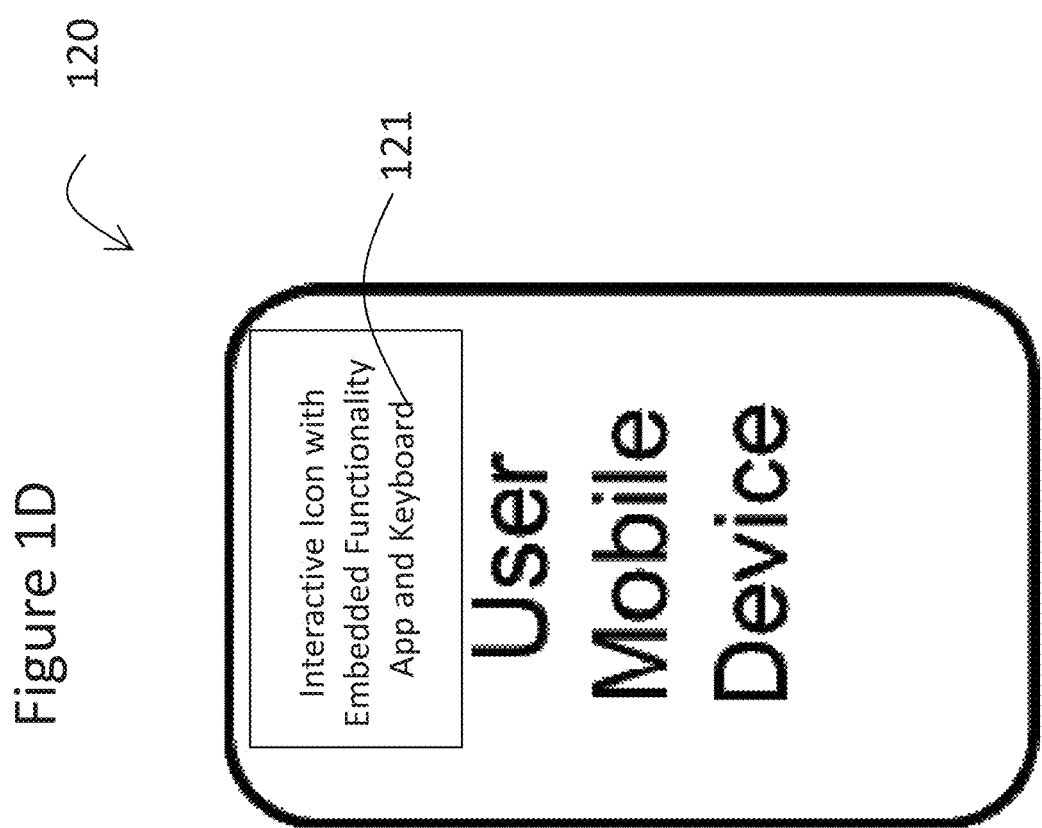

INTERACTIVE ICONS WITH EMBEDDED FUNCTIONALITY USED IN TEXT MESSAGES

CROSS-REFERENCE TO RELATED APPLICATIONS

The present application is a continuation of U.S. patent application Ser. No. 15/338,120, filed Oct. 28, 2016, which claims priority pursuant to U.S.C. § 119(e) to U.S. Provisional Patent Application No. 62/249,069, filed Oct. 30, 2015, both of which are hereby incorporated by reference.

TECHNICAL FIELD

Embodiments of the present invention generally relate to a method and system for interactive icons with embedded functionality, and more particularly relate to a method and system for finding, selecting, inserting, sending, and activating interactive icons with embedded functionality used in text messages without leaving the text messaging application.

BACKGROUND OF THE INVENTION

Emoji, from the Japanese word that literally means "picture" (e)+"character" (moji), are ideograms or smileys that are used widely in text messaging, and are seen or appear in a text message similar to a picture or image. A large number of emoji exist in various genres, including facial expressions, common objects, places and types of weather, animals, etc. Emoji are included in many smart phones. However, they differ, for example, in fonts, among different systems (e.g., Apple's iOS vs. Google's Android). There are also current custom emoji. Custom emoji are shared via a copy and paste format.

Sometimes, users also want to include a link, image, or picture, for places they frequent and brands they use in their messages. The users currently either have to write-out the name or cut and paste the link, image, or picture, for places they frequent and brands they use. In addition, the users of text messaging have to toggle between websites, applications (also referred to herein as apps) and messaging. For example, friends texting one another regarding dinner plan, will have to switch back and forth between text messaging, search engine (e.g., Google, Yahoo!), maps application (e.g., Google maps), restaurant websites, rating app (e.g., Yelp), reservation app (e.g., OpenTable), and so on. This process is time consuming and very inconvenient.

For advertisement, brands are currently reaching mobile customers through traditional online advertising like banner ads, email or website promotions, their own apps and loyalty programs, and social media campaigns. This type of advertising is brand-driven and is not user-driven. A brand or company logo could be sent as a static copy and paste image, with link sent separately.

It would therefore be desirable to provide a method and system of providing interactive icons with embedded functionality used in text messages, wherein the interactive icons may be previewed, selected, sent, received and viewed like emojis in a text, including people emojis and social media functions, without leaving the text messaging application. The present invention meets these and other needs.

BRIEF SUMMARY OF THE INVENTION

Briefly, and in general terms, the present invention provides for a system for communicating using interactive icons with embedded functionality. The system includes one or more servers coupled to a communication network, a database coupled to the servers for storing a plurality of interactive icons with embedded functionality, and one or more user devices coupled to the servers. Each user device includes a messaging application with a virtual keyboard having one or more interactive icons with embedded functionality. The messaging application, without leaving the messaging application, creates, sends, or receives one or more interactive icons with embedded functionality in a text message.

In some embodiments, an interactive icon application, without leaving a messaging application, creates the interactive icons with embedded functionality by inserting the interactive icons with embedded functionality in-line with the text message.

In some embodiments, the messaging application, without leaving the messaging application, inserts the interactive icons with embedded functionality in a new message.

In some embodiments, the present invention provides for a method for creating interactive icons with embedded functionality in a server coupled to a communication network, downloading the interactive icons with embedded functionality from the server to one or more user devices coupled to the communication network; creating, by a messaging application in a first user device, a text message including one or more interactive icons with embedded functionality; sending, by the messaging application in the first user device, the text message including one or more interactive icons with embedded functionality; receiving, by a messaging application in a second user device, the text message including the one or more interactive icons with embedded functionality; and activating, by the messaging application in the second user device, the interactive icons with embedded functionality without leaving the messaging application in the second user device.

These and other aspects and advantages of the invention will be apparent from the following detailed description and the accompanying drawing, which illustrates by way of example the features of the invention.

BRIEF DESCRIPTION OF THE DRAWING(S)

Illustrated in the accompanying drawing(s) is at least one of the best mode embodiments of the present invention In such drawing(s):

FIG. 1A is an exemplary diagram of an interactive icon with embedded functionality system, according to an embodiment of the invention.

FIG. 1B is an exemplary diagram of an interactive icon with embedded functionality server system, according to an embodiment of the invention.

FIG. 1C is another exemplary diagram of an interactive icon with embedded functionality server system, according to an embodiment of the invention.

FIG. 1D is an exemplary diagram of a user device, according to an embodiment of the invention.

FIG. 4B-2 illustrates another exemplary interactive icon with embedded functionality keyboard showing recently used interactive icons, according to an embodiment of the invention.

FIG. 4B-3 illustrates another exemplary interactive icon with embedded functionality keyboard user interface inserting an interactive icon in a new message, according to an embodiment of the invention.

FIG. 4C-1 illustrates an exemplary expanded interactive icon with embedded functionality keyboard, according to an embodiment of the invention.

FIG. 4C-2 illustrates another exemplary expanded interactive icon with embedded functionality keyboard, according to an embodiment of the invention.

FIG. 4C-3 illustrates an exemplary preview interface of an interactive icon, according to an embodiment of the invention.

FIG. 5E illustrates exemplary option bar icons, according to an embodiment of the invention.

FIG. 6A-1 illustrates another exemplary interactive icon with embedded functionality received in a new message, according to an embodiment of the invention.

FIG. 6A-2 illustrates another exemplary interactive icon with embedded functionality received in a new message, according to an embodiment of the invention.

FIG. 6B-1 illustrates another exemplary interactive icon with embedded functionality user interface showing options, according to an embodiment of the invention.

FIG. 6B-2 illustrates another exemplary interactive icon with embedded functionality user interface showing options, according to an embodiment of the invention.

DETAILED DESCRIPTION OF THE INVENTION

Figure 2:
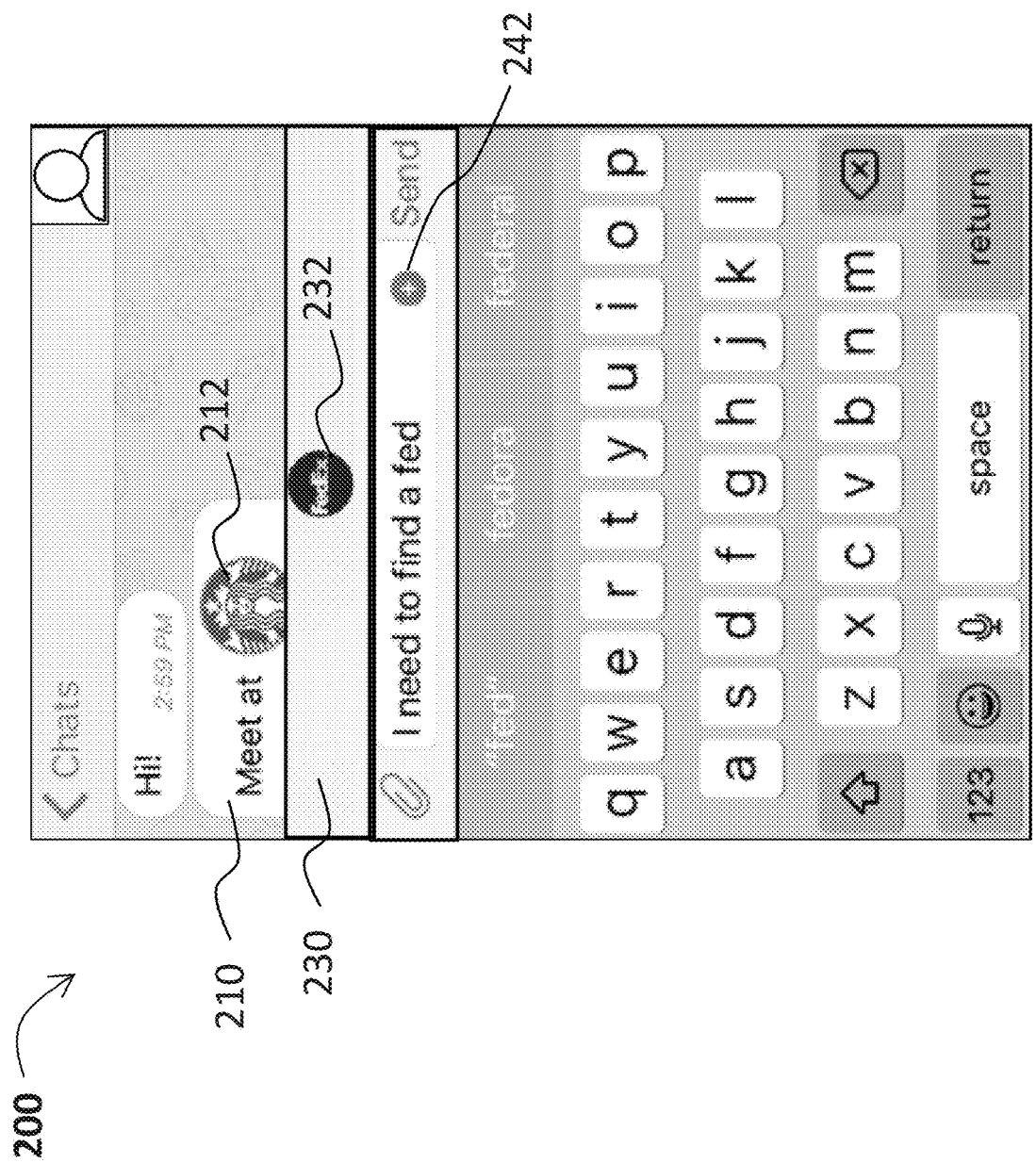
FIG. 2 illustrates an exemplary user interface of a text messaging app on a user device.

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

In the following description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Described now in detail is a method and system for emojis, images, icons, logos, pictures, etc., which may be interactive icons with embedded functionality, for example, via one or more option bars or via an interactive icon interface, and can be used in text messages, for example, as used in text messaging apps. As will be shown herein, the interactive icons with embedded functionality may be selected from a virtual keyboard displayed at the user device, or from a predictive texting function.

Sometimes, users also want to include a link, image, or picture, for places they frequent and brands they use in their messages. The users currently either have to write-out the name or cut and paste the link, image, or picture, for places they frequent and brands they use. In addition, the users of text messaging currently toggle between websites, apps and messaging. For example, friends texting one another regarding dinner plan, will switch back and forth between text messaging, search engine (e.g., Google, Yahoo!), maps application (e.g., Google maps), restaurant websites, rating app (e.g., Yelp), reservation app (e.g., OpenTable), and so on. This process is time consuming and very inconvenient.

For advertisement, brands are currently reaching mobile customers through traditional online advertising like banner ads, email or website promotions, their own apps and loyalty programs, and social media campaigns. This type of advertising is brand-driven and is not user-driven. A brand or company logo could be sent as a static copy and paste image, with link sent separately.

The system and method described herein provide emojis, images, icons, pictures, etc., that may be dynamically updated, selectable, including embedded functionality, and may be sent in the line of text, for example, like a standard Unicode emoji would look when sent and received, or in a separate text message. For the purpose of discussion, these emojis with embedded functionality are referred herein as interactive icons with embedded functionality, or interactive icons, or logo emojis for brevity. In some embodiments, the interactive icons with embedded functionality may be created (for example, inserted), sent, and received in a seamless text sentence that does not have to be broken up, e.g., by a separate line of a text message for the image. In some other embodiments, the interactive icons with embedded functionality may be created, sent, and received in a separate text message. The interactive icons with embedded functionality may be selected from a virtual keyboard, or from a predictive texting function. Other methods for selecting the interactive icons with embedded functionality may also be contemplated.

The interactive icon with embedded functionality system 100 can convert a word into an icon or image, for example, an exact logo of a company, or an image of a person. The converted icon or image can have embedded functionality which may be invoked, for example, via an option bar or an option interface with one or more options. Some of the functionalities may be hyperlinks, however, they may extend further, as they may be a phone number, or use GPS to find locations closest to a user, or the opening of a company's app, a company's web site, social media links, and so on. Other functionalities are also contemplated. It should be noted that the interactive icon with embedded functionality may not have to be governed by Unicode.

The system and method described herein may advantageously provide the interactive icons with embedded functionality, for example, for selecting a venue for meeting friends or selecting a service, while not requiring the user to switch out of (or leaving) the messaging application. The interactive icons with embedded functionality may be implemented in an app, for example, a messaging app. The interactive icons with embedded functionality may also be implemented as a built-in function or built-in application of an operating system, for example, Windows, iOS or Android. In an exemplary implementation, an interactive icon with embedded functionality built-in application or function may interface with a messaging app to provide the interactive icons with embedded functionality as described herein.

FIGS. 1A-6B illustrate the interactive icon with embedded functionality system and method according to at least one embodiment of the present invention.

Referring to FIG. 1A, in some exemplary embodiments, a computer-based interactive icons with embedded functionality system 100 is shown. The system 100 generally includes a server system 140 and a third party server system 150, both may be distributed on one or more physical servers, each having processor(s), memory, an operating system, and input/output interface, and a network interface all known in the art, and a plurality of end user computing devices 120/130 coupled to a public network 110, such as the Internet and/or a cellular-based wireless network. The user devices include, for example, mobile device 120, desktop or laptop device 130, or any device with text messaging, email, calendar, social media (Twitter, Facebook, etc.), search, or online communication capability and having processor(s), memory, an operating system, and input/output interface, and a network interface all known in the art. A mobile device 120 can include smart phone, tablet, smart watch and other wearables, or other network ready device all known in the art.

Referring to FIG. 1B, an exemplary diagram of an interactive icon with embedded functionality system 140 according to some embodiments is shown. The interactive icon with embedded functionality system 140 includes a user device interface 144 implemented with technology known in the art for communication with user devices 120, 130. As will be described in more detail below, the interactive icon with embedded functionality system 140 further includes an application program interface (API) 143 that provides an interface for the creation of interactive icons with embedded functionality and for providing interactive icons with embedded functionality to the user devices 120, 130. The API 143 is coupled to an interactive icon with embedded functionality engine 142 which provides the functions for developing or creating and handling of interactive icons with embedded functionality. The interactive icon with embedded functionality engine 142 is coupled to a database 141 to store information related to interactive icons with embedded functionality as will be described below. The database 141 may be implemented with technology known in the art, such as relational database and/or object oriented database. The interactive icon with embedded functionality engine 142 may also be locally or remotely coupled to one or more messaging apps 145 to support interactive icons with embedded functionality for those apps. The interactive icon with embedded functionality system 140 also includes a third party system interface (shown in this example as part of the interactive icon with embedded functionality engine 142) implemented with technology known in the art for communication with at least one third party system 150. The third party system 150 may be from a company that provides apps that can be embedded in one or more interactive icons with embedded functionality.

In some embodiments, the system 140 may be part of a user device. In these embodiments, the interactive icon with embedded functionality engine 142 may be the same as the interactive icon app referred to herein.

FIG. 1C illustrates another exemplary diagram of an interactive icon with embedded functionality system 140 according to some embodiments.

It should be noted that the interactive icons with embedded functionality can also be used outside of messaging applications. For example, it can be used in social media apps (e.g., Twitter, Facebook, etc.), email, mobile calendar, etc., such that the interactive icons described herein can be shared anywhere that users communicate online. In these embodiments, the messaging app 145 shown in FIGS. 1B and 1C may become the respective app that the interactive icons with embedded functionality are used with.

Interactive icons with embedded functionality may be created for use, for example, as an extension, with specific messaging apps. The messaging apps may reside in the user device 120, 130. Interactive icons with embedded functionality may also be created as part of an operating system, for example, Windows, iOS, Android, and the like. Interactive icons with embedded functionality may also become part of the Unicode.

Turning to FIG. 1D, an exemplary diagram of a user mobile device 120 according to some embodiments is shown. The user mobile device 120 includes an interactive icon with embedded functionality app and keyboard 121 (may also be referred to herein as interactive icon app and keyboard, interactive icon app or interactive icon keyboard) that is installed in, pushed to, or downloaded to the user mobile device 120. It should be noted that while the user mobile device 120 is shown as an example embodiment in FIG. 1D, the methods and systems described herein are also applicable to other user computing devices mentioned herein.

Referring to FIG. 2, a user interface 200 is shown having an exemplary text messaging conversation started on a user device 120. In this example, the user of user device 120 receives a text message 210 with an in-line interactive icon 212 for Starbucks™. The user may enter some text in reply. In this example, when the user types in a word, e.g., fed, the interactive icon with embedded functionality keyboard displays the predictive interactive icons bar 230. The predictive interactive icons bar 230 includes, for example, the interactive icon with embedded functionality 232 for the FedEx™ company. In some embodiments, the user may also use shortcut, for example, the open ended quote, ", as a shortcut to find the interactive icon with embedded functionality. For example, when the user types "fed, the interactive icon keyboard 121 may predict words such as FedEx and display the FedEx™ interactive icon. Other shortcuts may include "&" and the like.

Figure 3A:
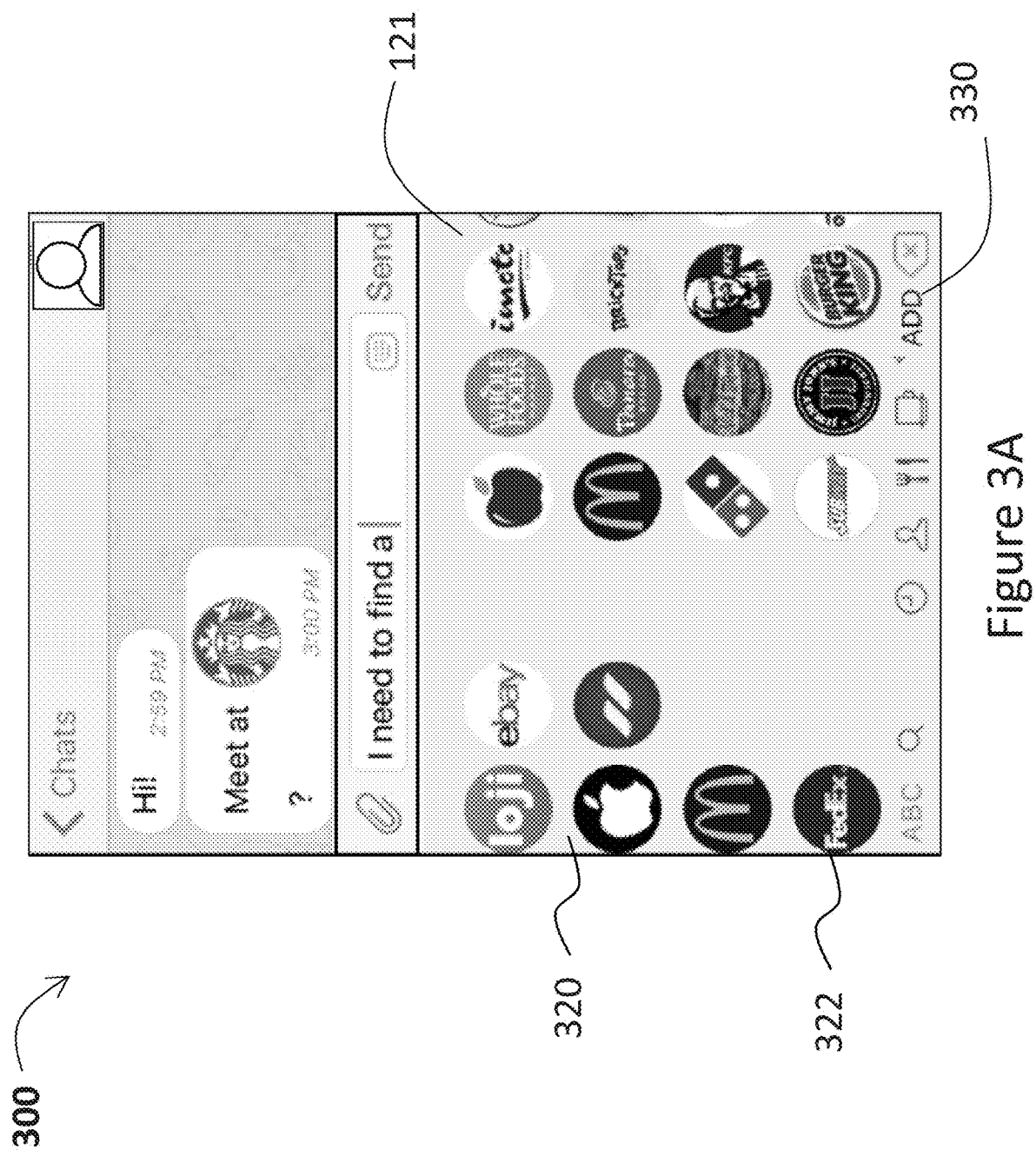
FIG. 3A illustrates an exemplary interactive icon with embedded functionality keyboard user interface, according to an embodiment of the invention.
Figure 3B:
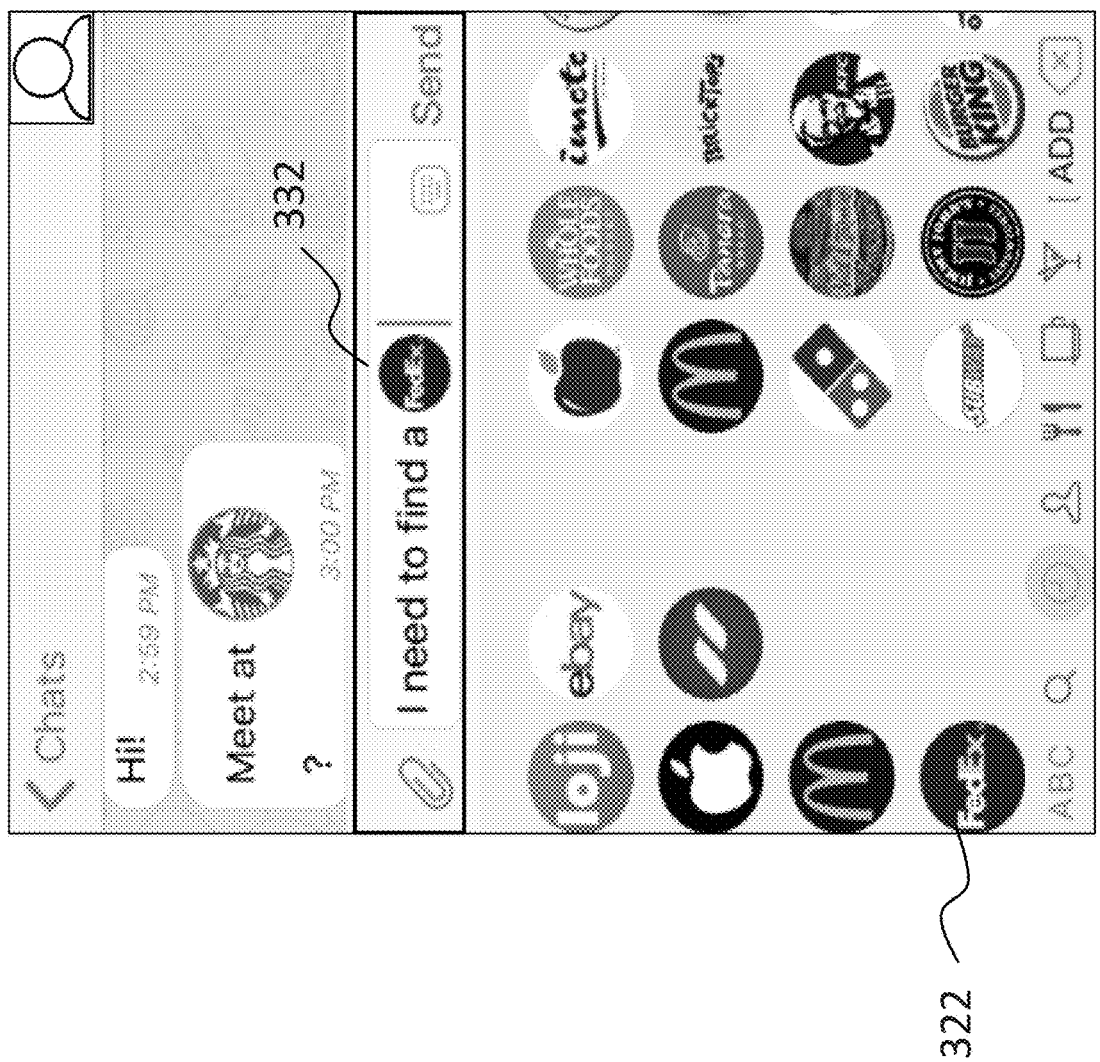
FIG. 3B illustrates an exemplary interactive icon with embedded functionality keyboard user interface inserting an in-line interactive icon, according to an embodiment of the invention.
Figure 3C:
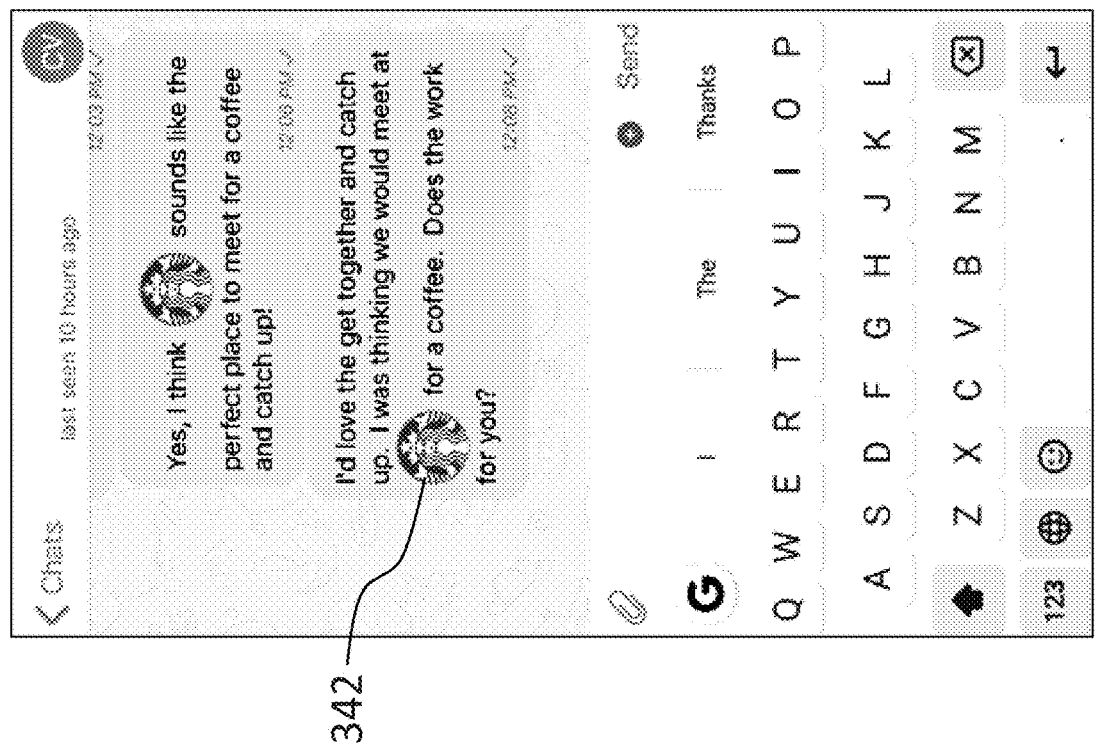
FIG. 3C illustrates another exemplary interactive icon with embedded functionality keyboard user interface inserting an in-line interactive icon, according to an embodiment of the invention.

Turning to FIGS. 3A and 3B, in some embodiments, the user can use the interactive icon keyboard 121 to input (may also be referred to herein as create) interactive icons with embedded functionality. The interactive icon keyboard 121 can be opened, for example, via an icon 242 (FIG. 2) of the current text messaging app, as custom keyboard and scrolls the same way as the standard Unicode emoji keyboard. The system 100 includes an algorithm that learns from the user. For example, the information learned from the user may be used to customized the interactive icon keyboard 121 with logos from everyday life of the user, for example the places the customer visits, in person or online. The interactive icon keyboard 121 can also include favorites and recently used interactive icons and tabs. Favorites may include the interactive icons that the user used the most. For example, the exemplary user interface 300 shows that the favorites 320 (e.g., eBay interactive icon, FedEx interactive icon 322, etc.) may be displayed first in the interactive icon keyboard 121, and may also be shown first in other user interfaces. FIG. 3B shows the user using the interactive icon keyboard 121 to select, for example, the interactive icon 322 for FedEx™. FIG. 3C shows another example of the user using the interactive icon keyboard 121 to select, for example, the interactive icon 342 for Starbucks™. The user may also select to expand the interactive icon keyboard 121 to see more interactive icons (see example in FIG. 4C). Once the user selects an interactive icon with embedded functionality, the interactive icon app inserts the interactive icon with embedded functionality into the text message being created. This is shown as the selected FedEx™ interactive icon 322 being inserted in-line as interactive icon 332.

In some embodiments, a user may open the interactive icon keyboard 121 to preview the available interactive icons and their respective embedded functionalities, including, for example, websites, social media sites, etc., without selecting any interactive icon for a text message.

Turning to FIGS. 4(A-D), an exemplary user interface 400 is shown. In some embodiments, the interactive icon app may insert the selected interactive icon into a new text message. FIG. 4A shows the user, while creating a text message 420, using the interactive icon keyboard 121 to select, for example, the interactive icon 422 for FedEx™ Once the user selects an interactive icon with embedded functionality, it may be created in, or inserted into, a new text message 430. The new message 430 is shown with the selected FedEx™ interactive icon 432, selected from the interactive icon keyboard 121, created in, or inserted into, the new text message 430. In some embodiments, when the user selects an interactive icon with embedded functionality, the user may preview, including people, websites, social media sites, etc., the selected interactive icon before selecting for use in a text message; see, for example, FIG. 4C-3 (People). As such, users can view the interactive icon interface (e.g., including the relevant information about a brand or person) without actually sending an interactive icon in a message. For example, as mentioned herein, in the interactive icon keyboard 121, the user can tap an interactive icon to view the detail. This can be useful in case the user needs the information, and does not need to share with/send to anyone.

Figure 4A:
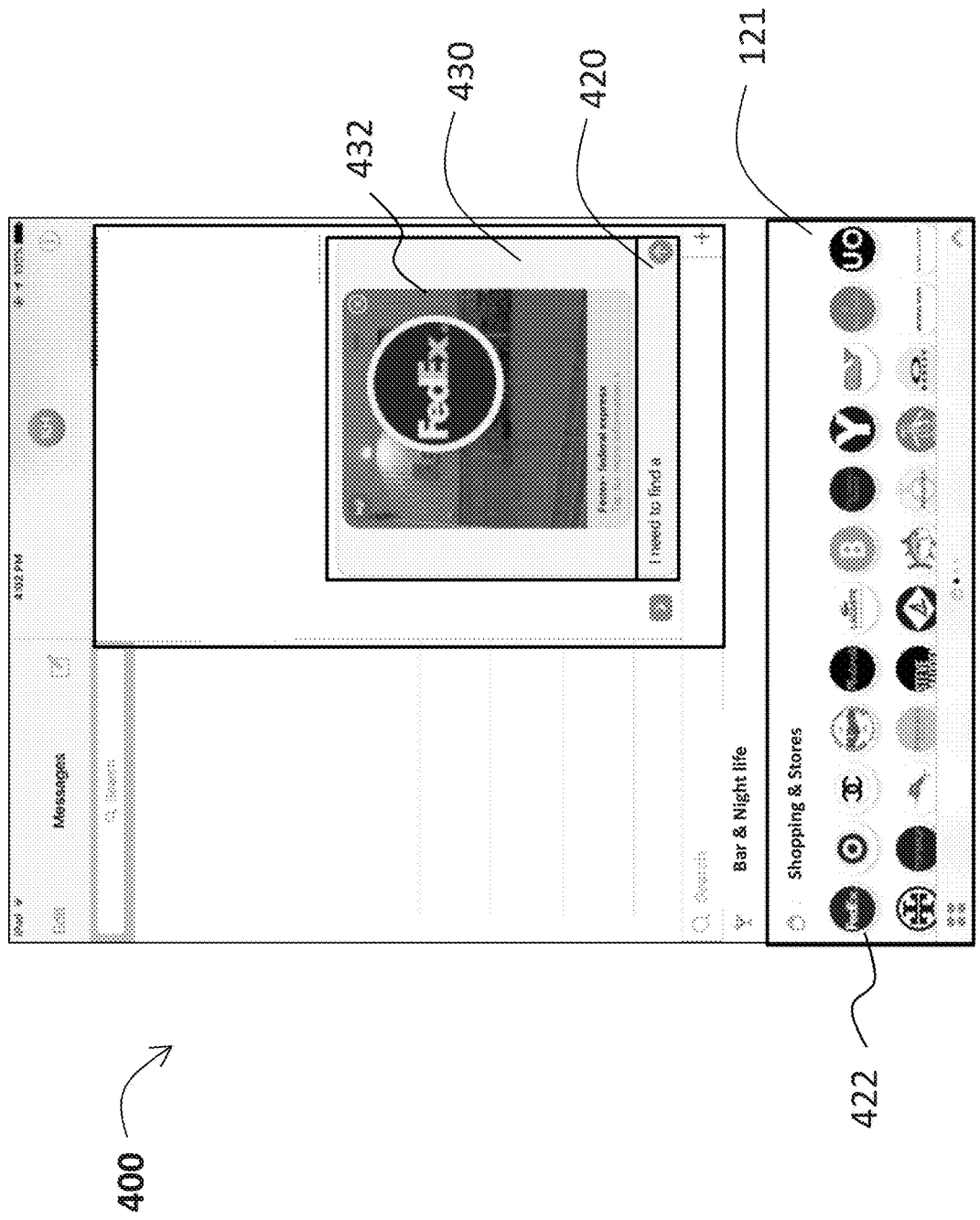
FIG. 4A illustrates an exemplary interactive icon with embedded functionality keyboard user interface inserting an interactive icon in a new message, according to an embodiment of the invention.
Figures 1, 4B:
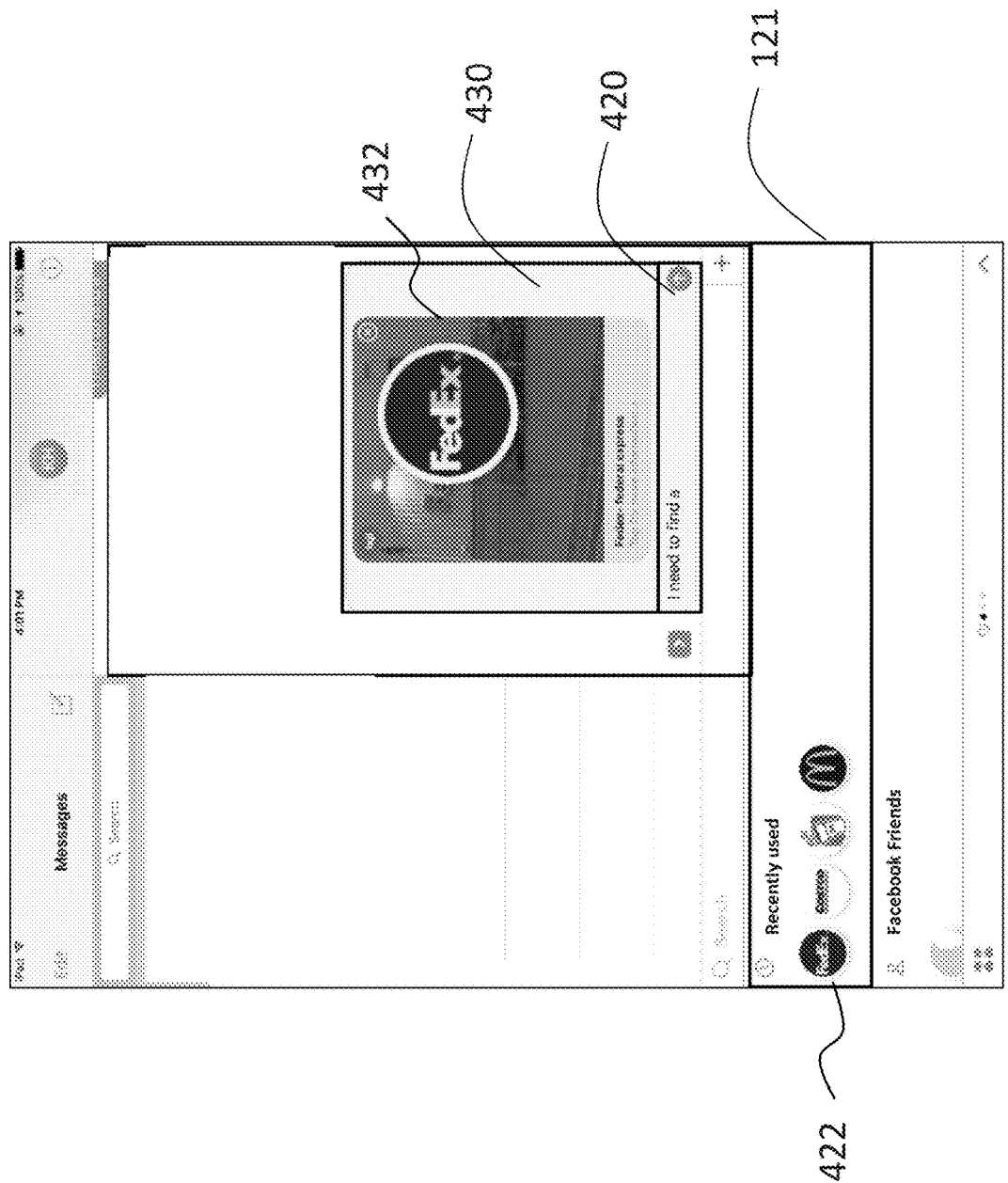
FIG. 4B-1 illustrates an exemplary interactive icon with embedded functionality keyboard showing recently used interactive icons, according to an embodiment of the invention.

In some embodiments, the interactive icon keyboard 121 may group the interactive icons in categories. For example, as shown in FIG. 4A, the FedEx™ interactive icon 422 may be grouped in the category "Shopping & Stores." Other categories may include "Bar & Night life," "Recently used" and "Facebook Friends," "Instagram Connections," and so on. As shown in FIGS. 4C1-4C2, the user may also select to expand the interactive icon keyboard 121 to see more interactive icons and more categories, for example, "Coffee & Tea," Sports," "People," Social Media "Friends," and so on. As described herein, FIG. 4B-1 shows the "Recently used" category of the interactive icon keyboard 121. The "Recently used" category may include Favorites which may include the interactive icons that the user recently used or used the most.

Figures 3, 4B:
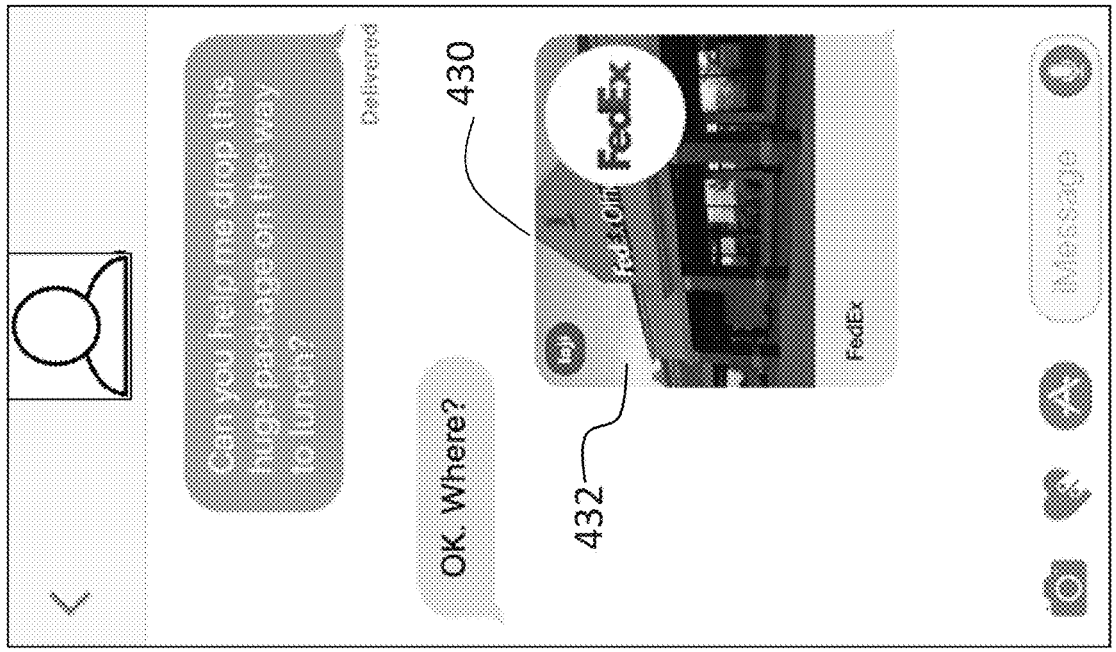
Figures 2, 4B:
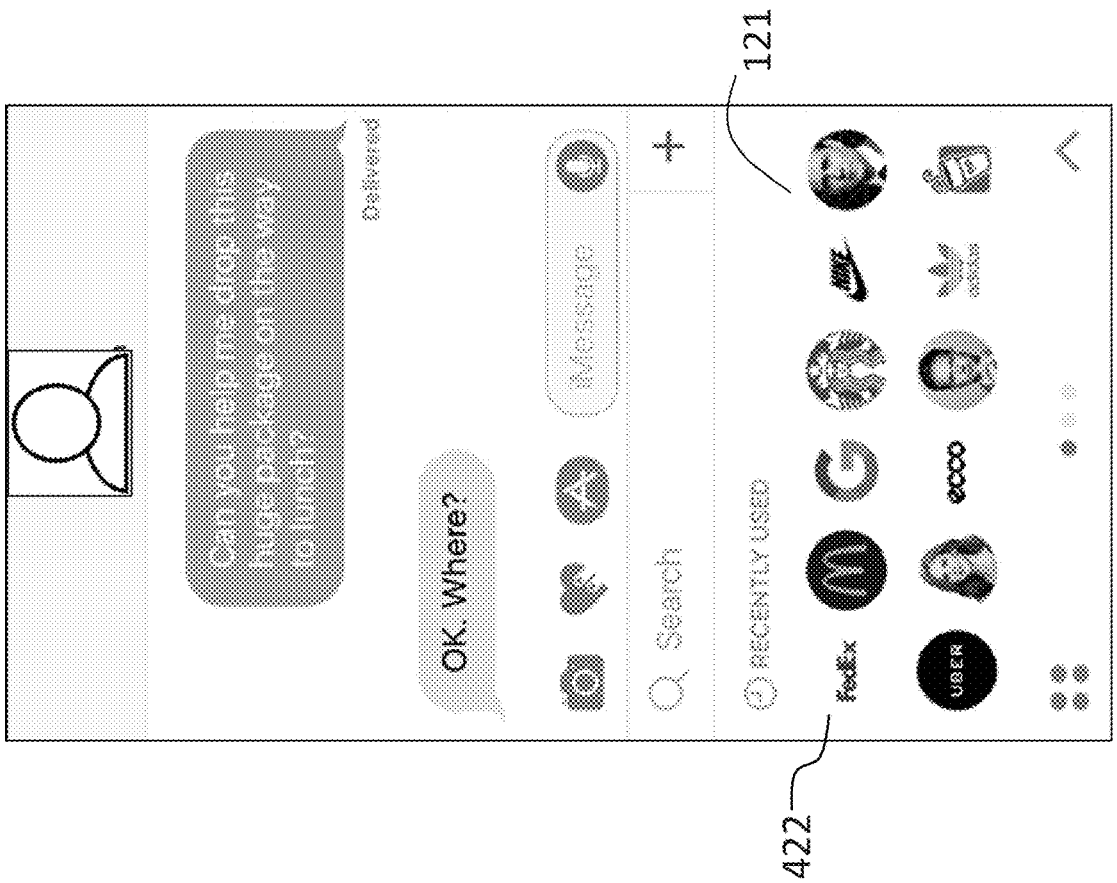
Figures 1, 4C:
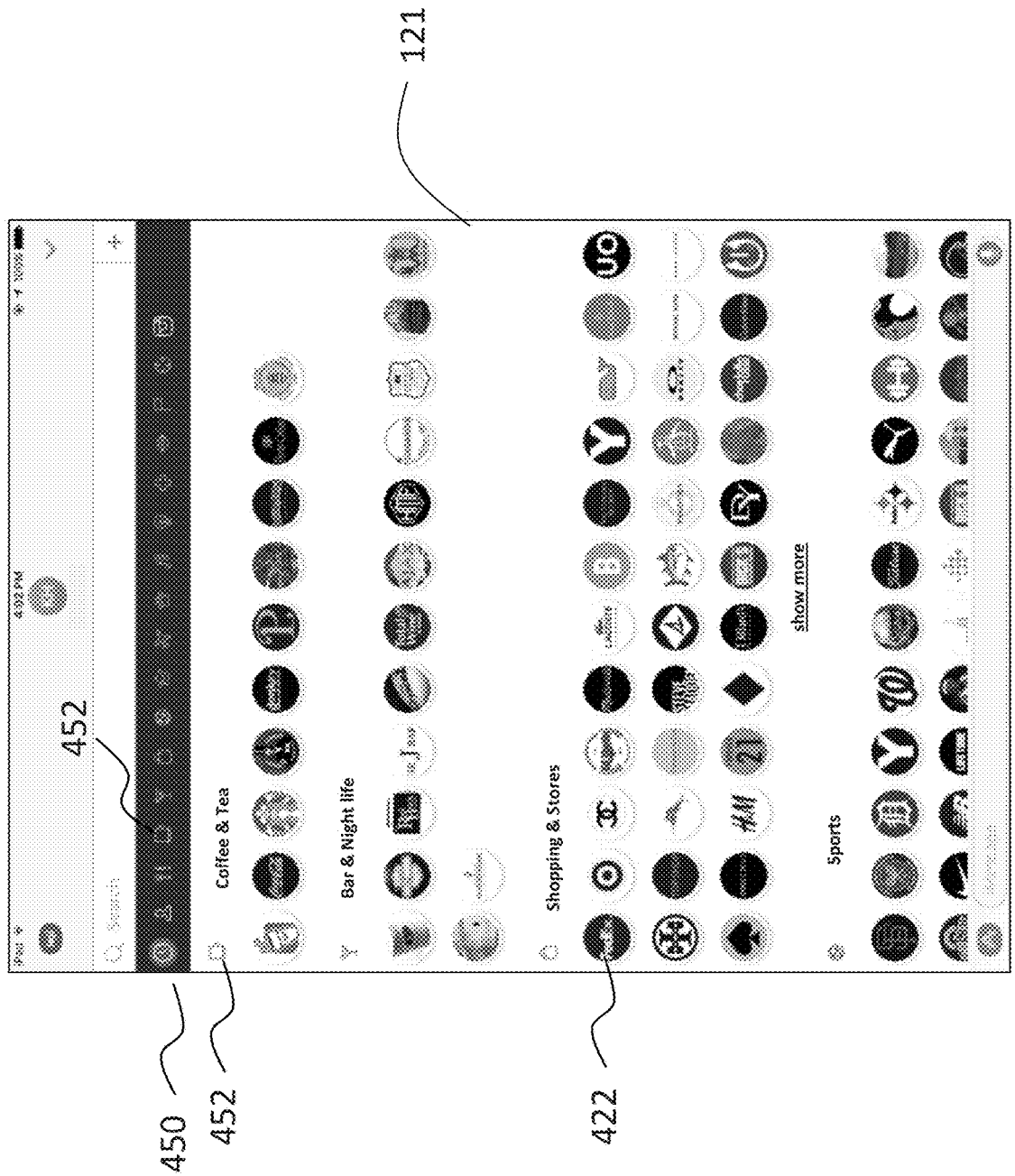
Figures 2, 4C:
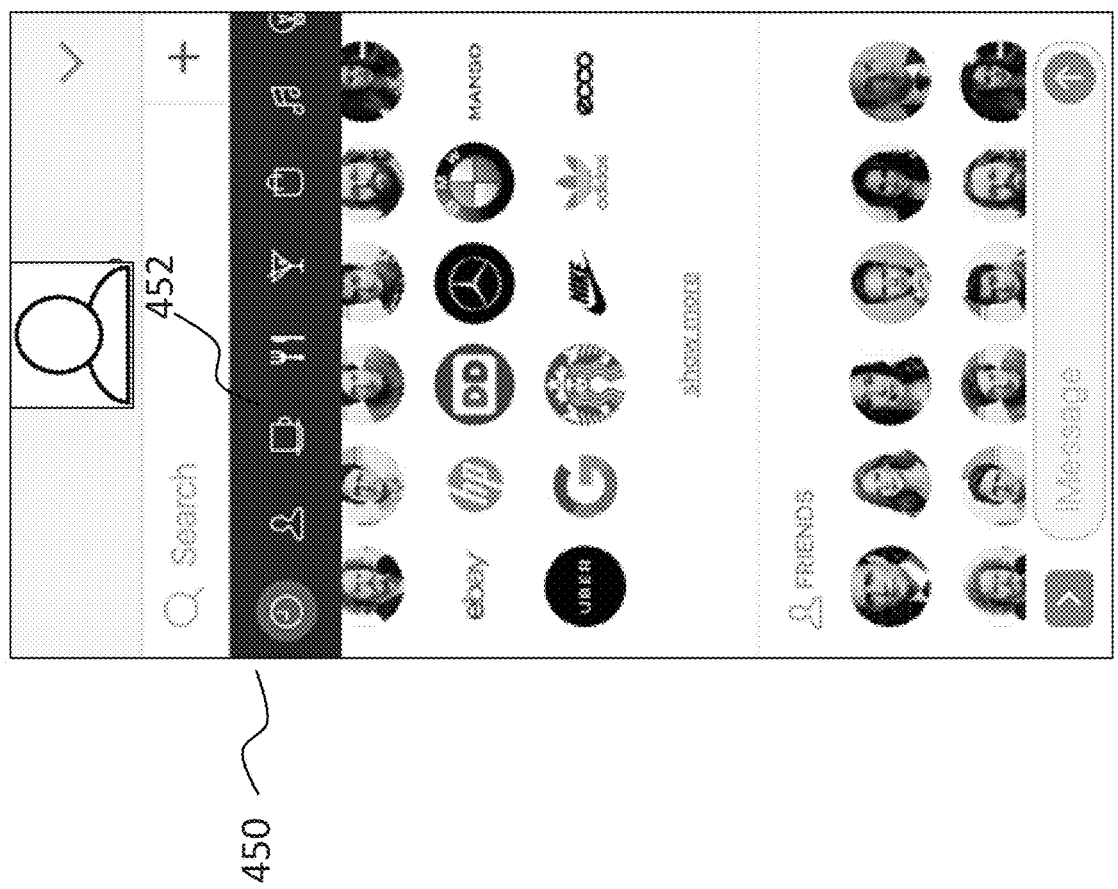
Figures 3, 4C:
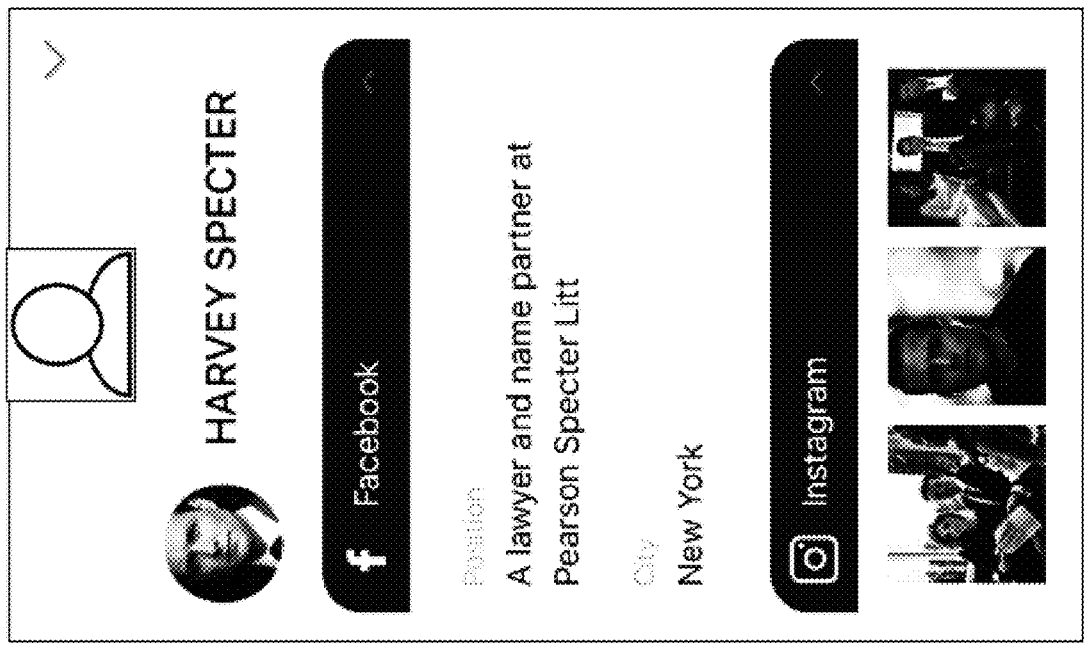

Similarly, FIGS. 4B-2 and 4B-3 illustrate exemplary user interface 400 in another user device, for example, in an Apple iPhone.

Turning to FIGS. 4C-1 and 4C-2, the interactive icon keyboard 121 may display a Category Bar 450 showing the categories of interactive icons. In the example of FIGS. 4C-1 and 4C-2, the Category Bar 450 displays one or more icons, each representing a different category. For example, the coffee cup icon 452 represents the category "Coffee & Tea." The other icons represent the other corresponding categories. Other methods of displaying the categories may also be used.

Figure 4D:
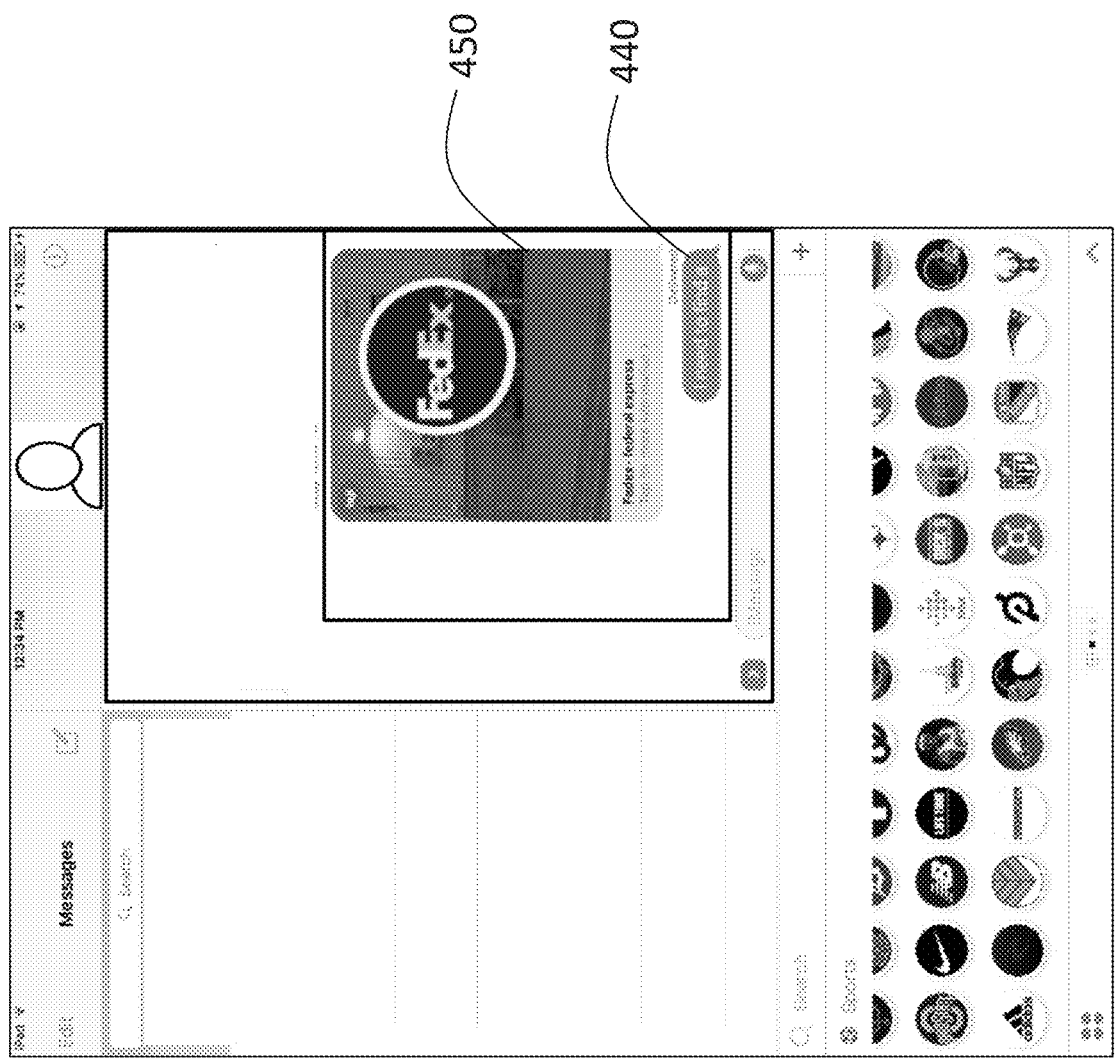
FIG. 4D illustrates an exemplary interactive icon with embedded functionality received in a new message, according to an embodiment of the invention.

FIG. 4D shows an exemplary user interface of another user receiving two text messages 440 and 450 when the user in FIGS. 4(A-B) sent the corresponding text messages 420 and 430.

It should be noted that although the examples in the Figures herein show the interactive icons with embedded functionality implemented in the text messaging app iMessage™ in an Apple iPad and iPhone, the interactive icons with embedded functionality is not limited to these Apple app and devices, but may also be implemented in other text messaging applications (app) in other mobile devices. The interactive icons with embedded functionality can also be used outside of messaging applications. For example, it can be shared/used in other apps like social media apps (e.g., Twitter, Facebook, etc.), and even in email, mobile calendar, etc. The interactive icons described herein can be shared anywhere that people communicate online.

It should also be noted that various functions described for embodiments where the interactive icons are inserted in-line may be available for embodiments where the interactive icons are inserted into a new text message, and vice versa (various functions described for embodiments where the interactive icons are inserted into a new text message may be available for embodiments where the interactive icons are inserted in-line). These functions may include, for example, predictive texting, categorization of interactive icons, option bar, option interface, etc.

Referring to FIGS. 5(A-D), an exemplary user interface 500 is shown having text messages received on a user device 120. The text messages include interactive icons with embedded functionality. As described herein, in some embodiments, the interactive icons with embedded functionality can be sent and displayed in an unobstructed, unbroken and consistent line of text. Also as described herein, the interactive icon with embedded functionality system 100 can convert a word into an exact icon or image, for example, an exact logo of a company, or an image of a person. The converted icon or image can have embedded functionality which may be invoked, for example, via an option bar or an interface with one or more options. Some of the functionalities may be hyperlinks, however, they may extend further, as they may be a phone number, or use GPS to find locations closest to a user, or the opening of a company's app, a company's web site, and so on.

Figure 5A:
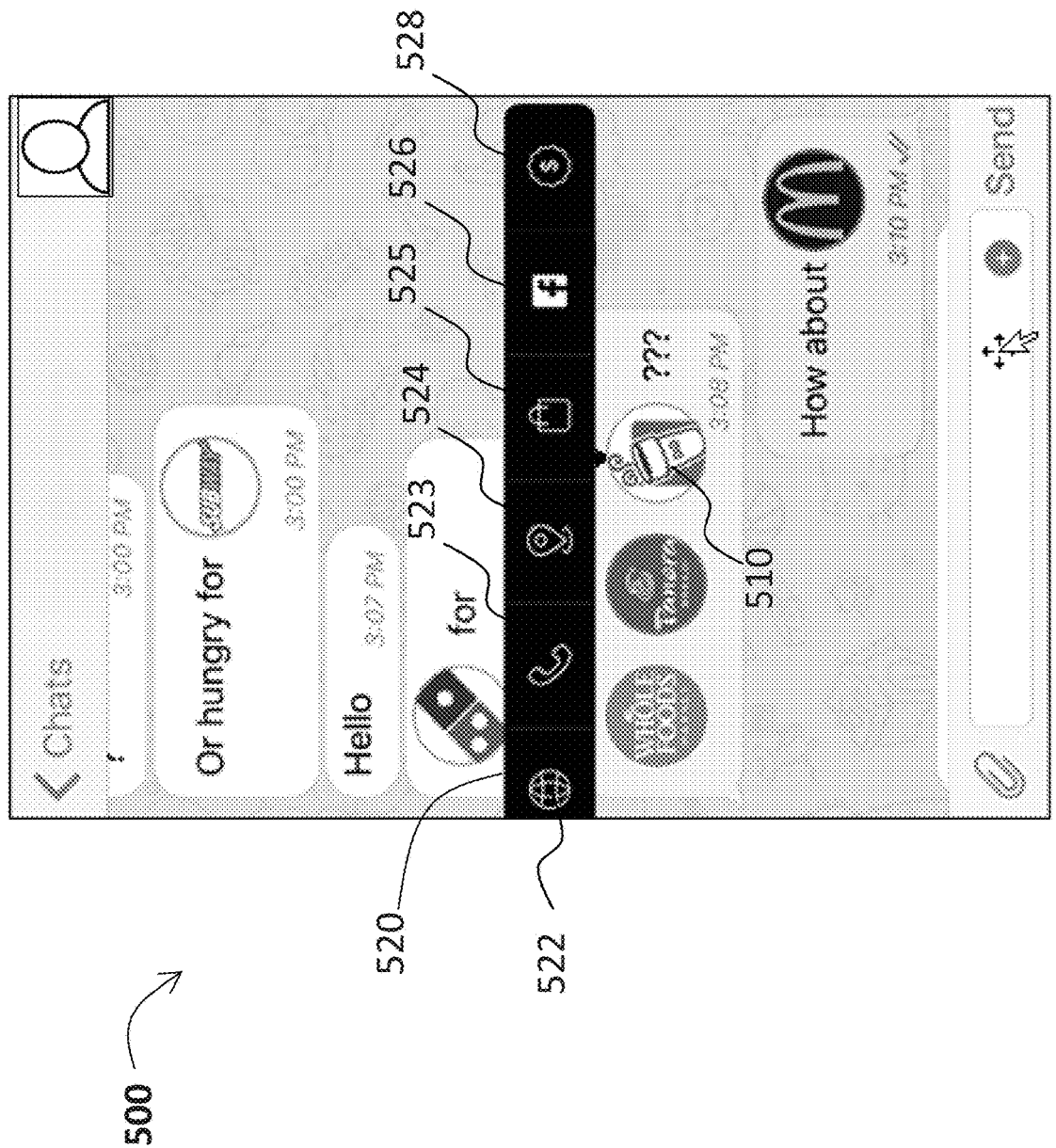
FIG. 5A illustrates an exemplary interactive icon with embedded functionality option bar user interface, according to an embodiment of the invention.

Turning to FIG. 5A, the received text messages include some interactive icons with embedded functionality, for example, Domino Pizza™ interactive icon, Whole Foods Market™ interactive icon, Panera Bread™ interactive icon, and Dunkin Donuts™ interactive icon 510. In some embodiments, the user may click on any of the interactive icons with embedded functionality to invoke or activate the one or more corresponding embedded functionalities. For example, when the user clicks on the interactive icon with embedded functionality 510, the interactive icon app displays an option bar 520. The option bar 520 may display functions relating to the interactive icon 510, from which the option bar 520 was selected. For example, when the interactive icon displays a Dunkin Donuts™ interactive icon, the functions in the option bar 520 may provide, as described herein, Dunkin Donuts™ locations, phone numbers, website, etc. The option bar 520 may display like a menu on a webpage. The option bar 520 may provide hyperlink choices that the user can select. For example, the option bar 520 may include GPS or maps option 524 that, when selected, will use the current location of the user device to find, for example, the closest locations for the selected interactive icon.

Figure 5B:
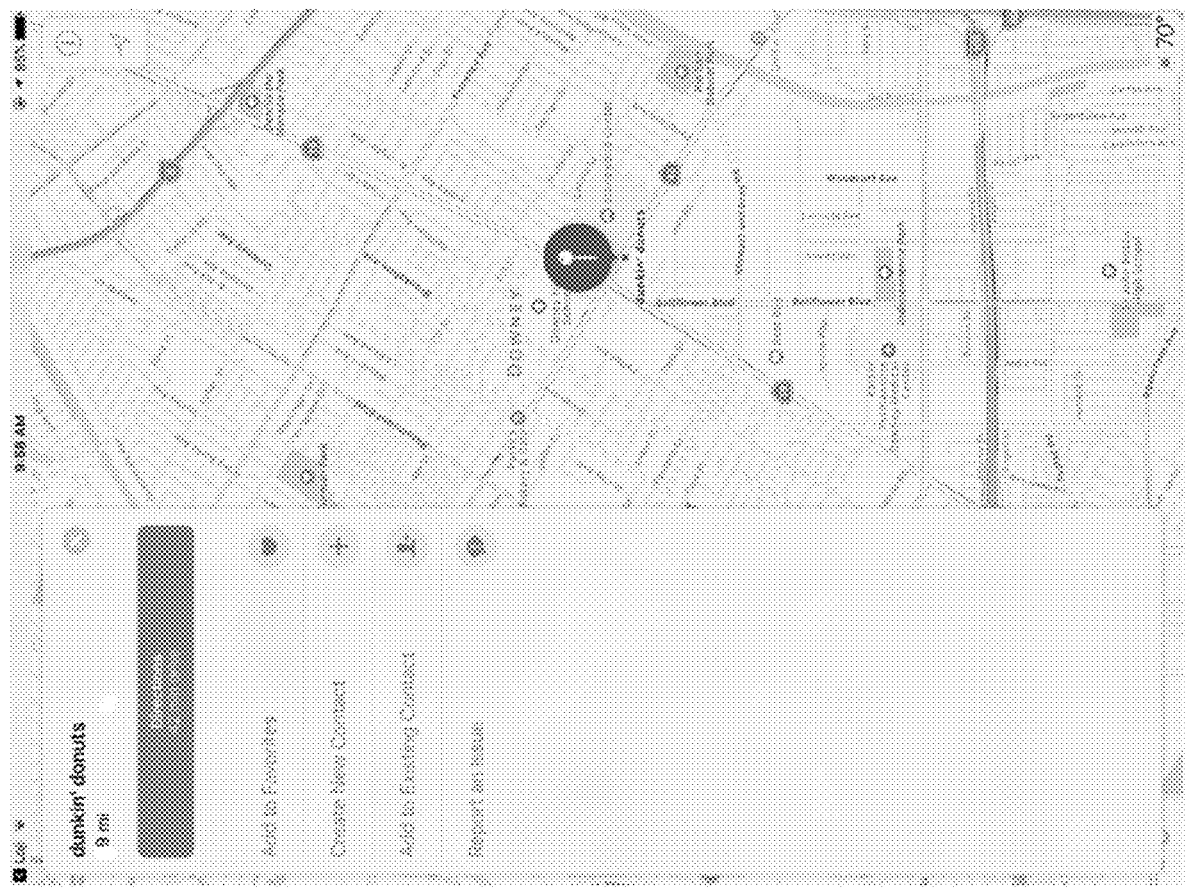
FIG. 5B illustrates an exemplary map display invoked by an interactive icon with embedded functionality option, according to an embodiment of the invention.

FIG. 5B shows an exemplary maps displayed when the user selects the maps option 524. The option bar 520 may also include a Call option 523 that will use APIs to pull, for example, a phone number either from information submitted with the logo (during the development or creation of the interactive icon with embedded functionality), or will pull the information from a search, for example, Google search. The user may be able to call the selected company from the user interface.

Figure 5C:
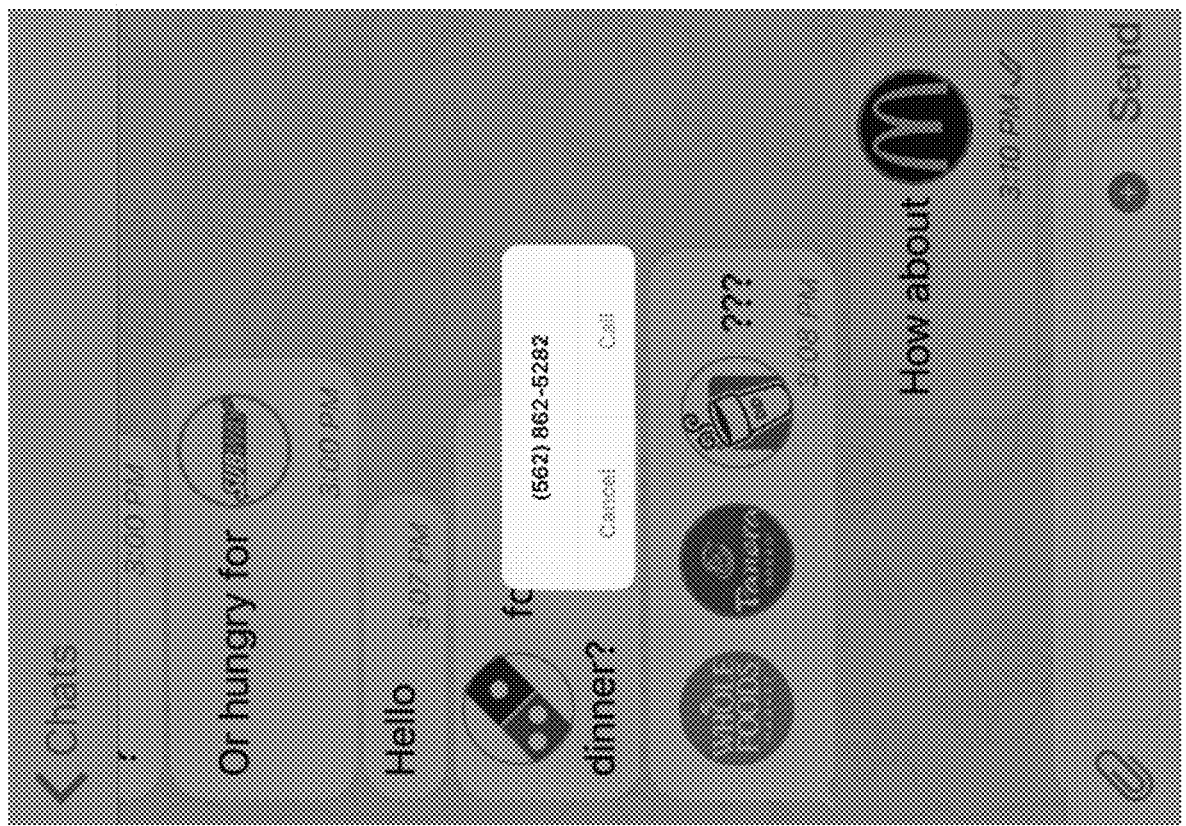
FIG. 5C illustrates an exemplary Call option display invoked by an interactive icon with embedded functionality option, according to an embodiment of the invention.

FIG. 5C shows an exemplary phone interface displayed when the user selects the Call option 523. The option bar 520 may also include a Web/App option 522 (shown in FIG. 5A) that may either open, e.g., immediately, the company's app if downloaded to the user device, or will link to the company's website (website either submitted during the interactive icon development or creation, or pulled from a search, e.g., Google search). The option bar 520 may also include a Promo option 528 that will direct the user straight to the website/landing page of the interactive icon owner's choice.

Figure 5D:
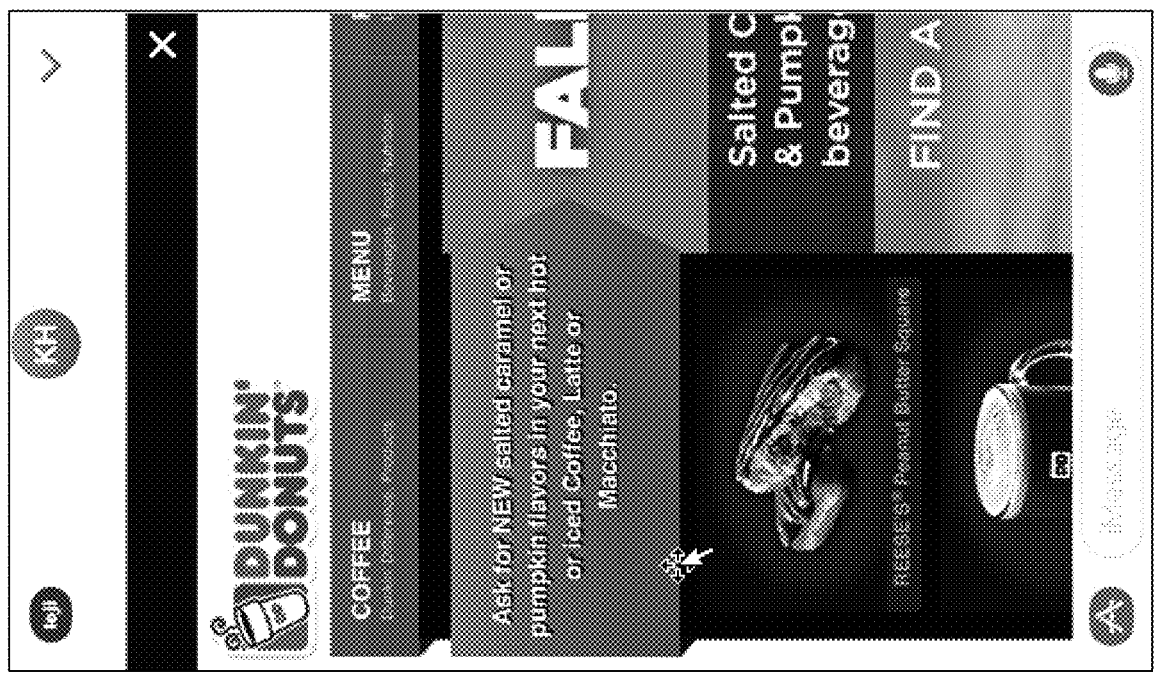
FIG. 5D illustrates another exemplary display of a website invoked by an interactive icon with embedded functionality option being opened within iMessage. The interactive icon with embedded functionality opened a weblink or website within the message app, according to an embodiment of the invention.

FIG. 5D shows an exemplary interface displayed when the user selects the Web/App option 522, or the Order/Shop/Buy option 525, or the Promo option 528. In this example, the system 100 links to the company's web site.

The Social Media option 526 may link the user to Facebook. Other Social Media options, for example, Twitter, Google+, LinkedIn, and so on, may also be provided. The option bar 520 may also include an Other/More option (not shown) that will further provide other or more options (not shown), for example, OpenTable™, Yelp™, and the like. It should be appreciated that other options are also contemplated for the option bar 520.

Figures 1, 6A:
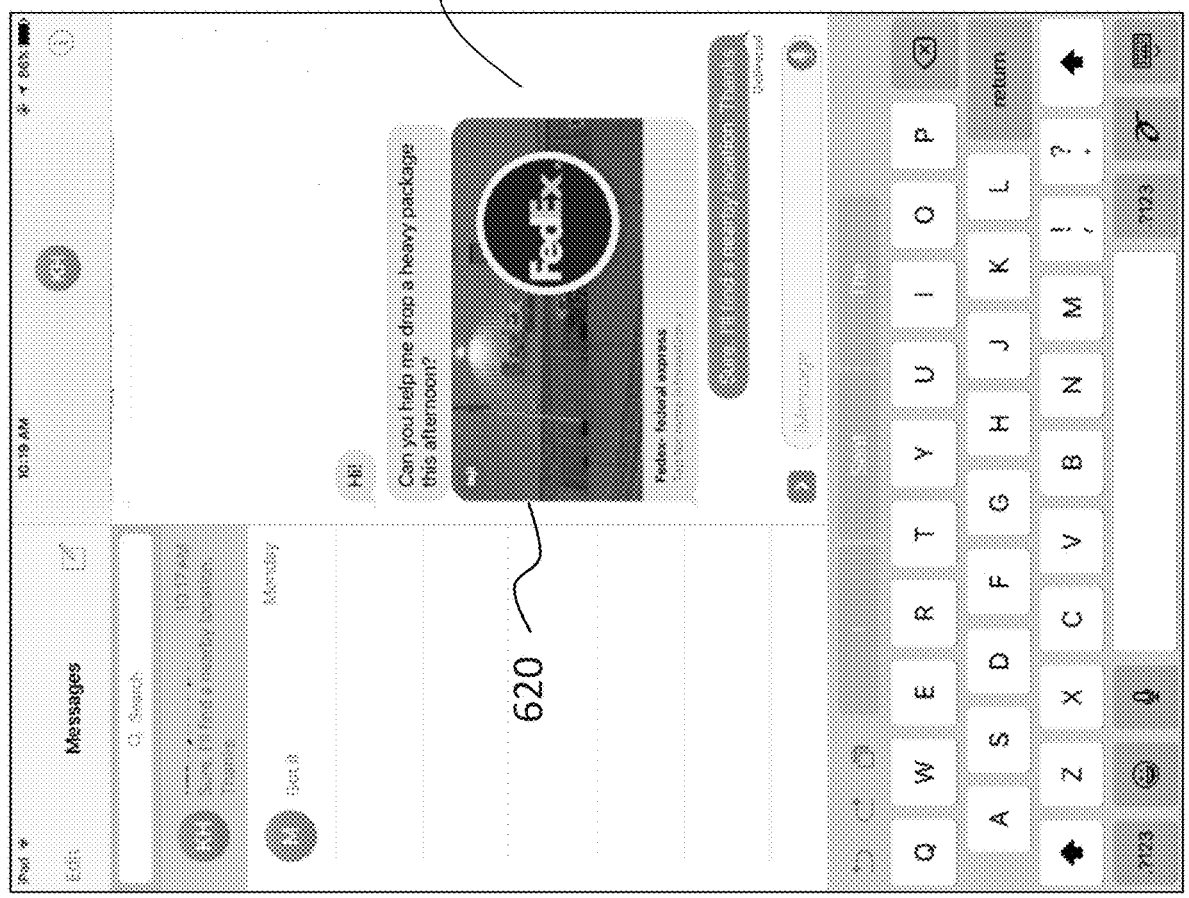
Figures 2, 6A:
Figures 1, 6B:
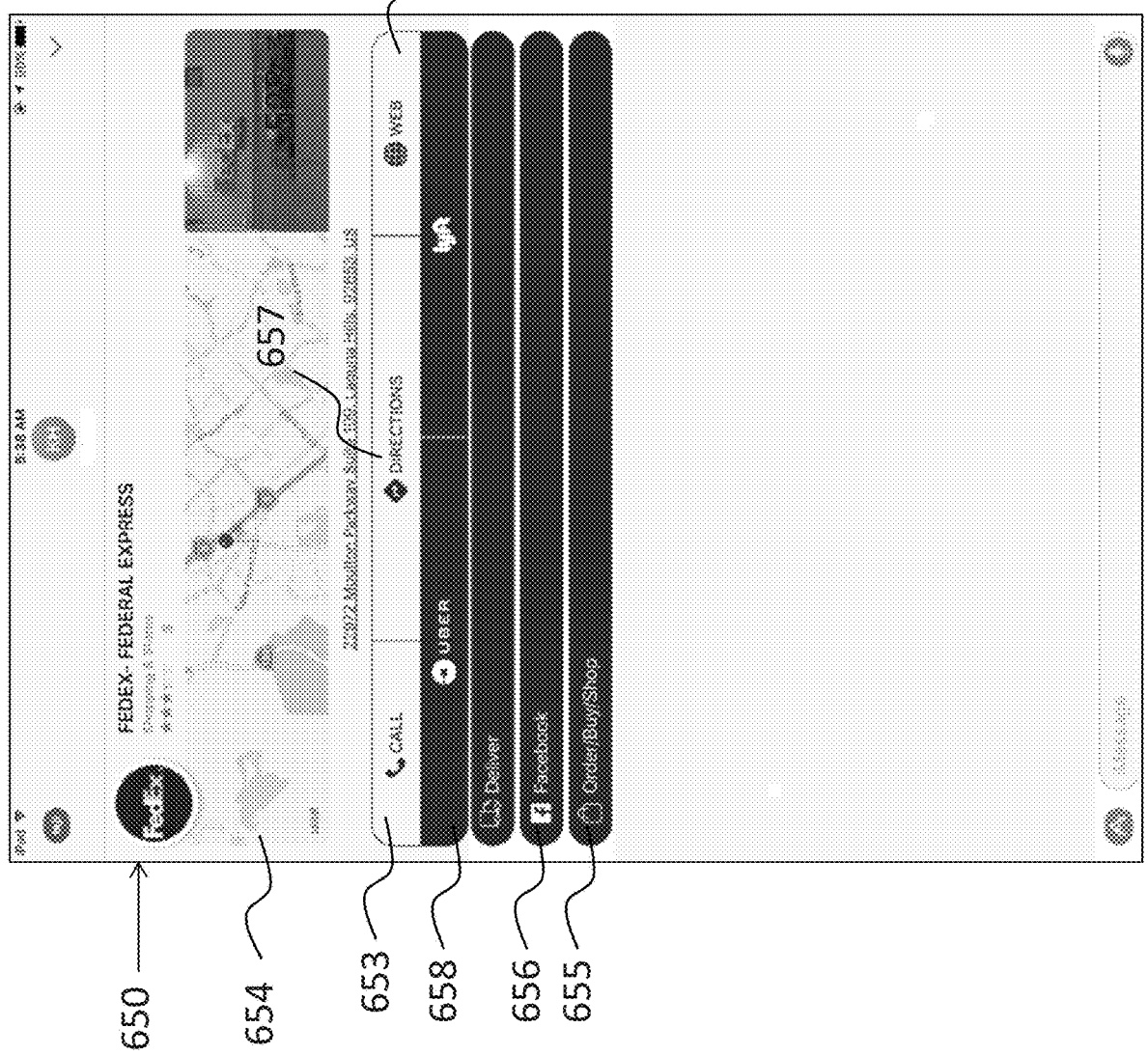
Figures 2, 6B:
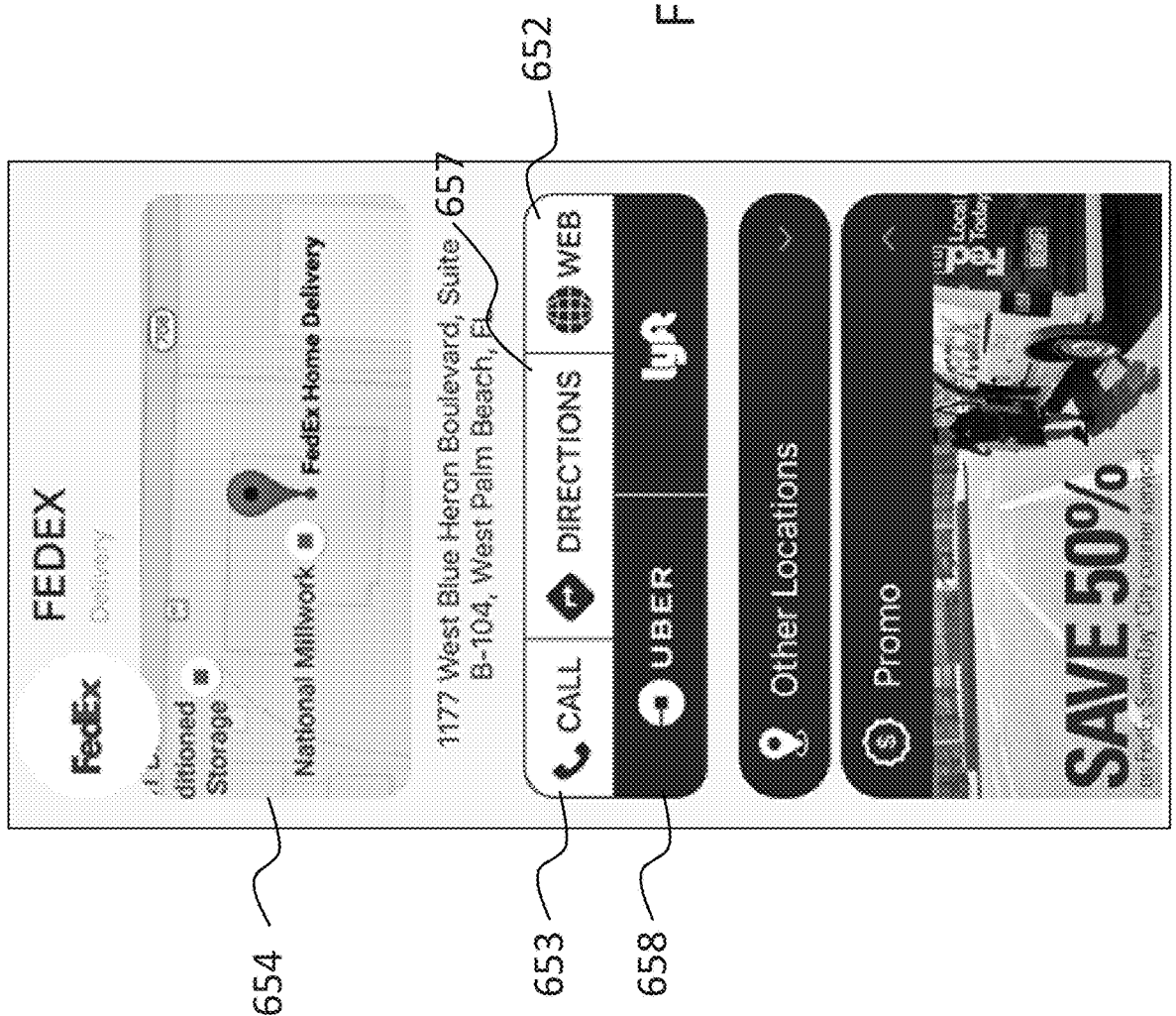

FIG. 5E illustrates other exemplary icons that may be included in the option bar 520. These icons may represent, for example, Facebook, Instagram, Snapchat, Twitter, LinkedIn, YouTube, Pinterest, Periscope, Webpage/website, Call/Phone Number, Map, Location—closest location and other locations, Directions, Yelp, OpenTable, Vine, Tumblr, Google, Google+, Promotion, Contest, Sweepstakes, Sale, Delivery, Chat, Email, Chatbot, Rating, Review, Price Range, Category, Pictures/Images, and so on, Turning to FIGS. 6(A-B), an exemplary user interface 600 is shown. The user interface 600 shows exemplary text messages received at a user device 120. As described herein, in some embodiments, the interactive icons may be sent in a separate text message. Correspondingly, FIG. 6A-1 shows a received text message 610 including an interactive icon, for example, interactive icon FedEx™ 620. FIG. 6A-2 illustrates exemplary user interface 600 in another user device, for example, in an Apple iPhone. In some embodiments, the user may click on any of the interactive icons with embedded functionality to invoke or activate the one or more corresponding embedded functionalities. For example, when the user clicks on the interactive icon with embedded functionality 620, the interactive icon app displays a user interface (or option interface) 650 as shown in FIGS. 6B(1-2). The user interface 650 may provide hyperlink choices that the user can select. For example, the user interface 650 may include GPS or maps 654 that uses the current location of the user device to find, for example, the closest locations for the selected interactive icon. The user interface 650 may include a Direction option 657 which may use the user device's current location, the device GPS to pull the directions to the target in the interactive icon and display them. The user interface 650 may also include a Call option 653, a Web/App option 652, an Order/Buy/Shop option 655, and a Social Media option 656 similar to the options shown in an option bar 520 described in FIGS. 5(A-D). The user interface 650 may also include transportation options 658 with links to the website or app of the corresponding transportation companies, for example. Uber™, Lyft™, and so on. The user interface 650 may also include an Other/More option (not shown) that will further provide other or more options (not shown), for example, OpenTable™, Yelp™, and the like. It should be appreciated that other options are also contemplated for the user interface 650.

FIGS. 6B-1 and 6B-2 illustrate exemplary user interface 650 in different user devices, for example, in an Apple iPad and iPhone.

In some embodiments, APIs are used to enable the hyperlinks in the option bar 520 and the user interface 650.

As described herein, the interactive icon app may keep the users in the text messaging app so that the users do not have to leave the text messaging app to select a logo, or to find needed information. This information may include, for example, phone numbers, addresses, promotions, maps, directions, and so on. As a result, valuable customer capture will be available because using the interactive icons keeps a user within the messaging app. The user does not have to leave the message to find the information they need. The interactive icon with embedded functionality system 140 can also keep data analytics and business intelligence based on tracking of interactive icons with embedded functionality use. Interactive icons with embedded functionality may thus be user-driven, and a platform for brand lead and/or user lead promotions. However, in the user lead promotions, the brands or companies may still retain control of the promotions.

In some embodiments, the interactive icon with embedded functionality app and keyboard 121 can be created using an SDK (software development kit), for example as provided by the interactive icon with embedded functionality system 140. In some embodiments, the interactive icon with embedded functionality app and keyboard 121 can be created and integrated, for example, as an extension, into a messaging application without using an SDK. In other embodiments, the interactive icon with embedded functionality app and keyboard 121 can be created using the API 143 in the interactive icon with embedded functionality system 140. In yet some other embodiments, the interactive icon with embedded functionality app and keyboard 121 can be created using both the API 143 in the interactive icon with embedded functionality system 140 and an SDK. The interactive icon with embedded functionality keyboard 121 is dynamic and is updated with new icons continuously, on demand, or according to schedules, using APIs, or other web based communication platforms, for example, social media, email, etc.

In some embodiments, interactive icons with embedded functionality can be added by brands or companies, or by the users. Brands or companies or users can add and/or develop/create new interactive icons with embedded functionality by submitting, for example, a vector or png logo and pertinent company info to the interactive icon with embedded functionality system 140. Users may also link their social media accounts, for example, Facebook, Twitter, or Instagram accounts. Other icon types are also contemplated. The interactive icon with embedded functionality system 140 then converts the logos to interactive icons with embedded functionality, and/or pulls social media information (e.g., profile information and images) and creates interactive icon with embedded functionality ownership. In some embodiments, brands or companies or users can submit logos and pertinent logo information on a website of the interactive icon with embedded functionality system 140. Brands or companies may update and/or manage their interactive icons. Registered users to the interactive icon with embedded functionality system 140 may also create/add accounts/links, and update and manage their own accounts/links and profile information.

In some embodiments, at the interactive icon with embedded functionality system 140, a master user(s) can update and add additional icons.

The interactive icons with embedded functionality are stored, for example, in the database 141. In some embodiments, the interactive icons with embedded functionality are included in the interactive icon app which is downloaded to a user device as described herein. The interactive icon app may also be installed as an extension of a mobile device's text messaging application, or of a mobile device's operating system. The database 141 is dynamic and can be continuously updated, or updated on a schedule. FIG. 3A shows an exemplary implementation where a user may select option 330 ("ADD") to request or submit a new interactive icon. As a result, the interactive icon keyboard may be customized.

In some exemplary operations, a user may first install the interactive icon app in a user device 120, for example, as an extension of a messaging app. Using the user interfaces provided by the messaging app, the user may next interact with the interactive icon app to perform the features and functions described herein. When the user opens and uses the features and functions of the interactive icon app, this may cause the messaging app to communicate with the API to retrieve data that may be used to build interactive icons. The API may communicate with a third-party system to retrieve needed information.

The embodiments described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

It should be noted that although the embodiments described herein are particularly suited for used in a messaging application without leaving the messaging application, the invention can also be used for outside of messaging applications. For example, it can be shared/used in other apps like Twitter, Facebook, (and other social media), and even in email, mobile calendar, etc. The interactive icons described herein can be shared anywhere that people communicate online.

In some embodiments, the invention described herein also includes an app that is within a messaging app. Using this standalone app, a user is still able to tap on an interactive icon to view the details and find the relevant information she needs. The information, including multiple links may all be connected via an interactive icon.

The interactive icons described herein are a way to communicate, but they can also be a simple way to pull the information like a traditional search engine would, but without the need to type out the name of the brand that the user is searching for information about, or without typing out the name of the person, place, thing, and so on.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A system for communicating logo icons with embedded functionality, the system comprising:
   one or more servers coupled to a communication network;
   a database coupled to the one or more servers for storing
      a plurality of logo icons with embedded functionality;
   one or more user devices coupled to the one or more servers;

a create function for dynamic creation of logo icons with embedded functionality to the database;
an add function for dynamic submission and update of logo icons with embedded functionality to the database;
a messaging application resided in the one or more user devices;
the messaging application including one or more logo icons with embedded functionality;
at least one of an option bar or a user interface displaying one or more selectable embedded functionalities;
wherein, at a first user device of the one or more user devices, the messaging application, without leaving the messaging application, inserts a logo icon with embedded functionality in a line of text of a text message, and sends the text message; and
wherein, at a second user device of the one or more user devices, the messaging application, without leaving the messaging application, receives the text message with the logo icon with embedded functionality in the line of text of the text message, and activates a functionality of the logo icon with embedded functionality in the text message.

2. The system of claim 1, wherein the one or more logo icons with embedded functionality include an image of a company logo.

3. The system of claim 2, wherein the one or more logo icons with embedded functionality are categorized by brands in the user interface or a virtual keyboard.

4. The system of claim 1, wherein the one or more interactive logo icons with embedded functionality include one or more hyperlinks.

5. The system of claim 1, wherein the one or more logo icons with embedded functionality include one or more application program interfaces.

6. The system of claim 1, wherein the one or more logo icons with embedded functionality are selected from a predictive texting function.

7. The system of claim 1, wherein the one or more logo icons with embedded functionality include an image of a person.

8. The system of claim 1, wherein the at least one of an option bar or a user interface includes GPS or maps option that, when selected, uses a current location of a user device of the one or more user devices to find the closest locations for a selected logo icon.

9. A non-transitory program storage device readable by a machine, the non-transitory storage device comprising instructions executable by at least one processor of the machine to perform a method for communicating text messages having one or more logo icons with embedded functionality, the method comprising the steps of:
upon receiving a create request, dynamically creating first one or more logo icons with embedded functionality in a server coupled to a communication network;
upon receiving an add request, dynamically adding second one or more logo icons with embedded functionality in the server;
downloading the first or second one or more logo icons with embedded functionality from the server to one or more user devices coupled to the communication network;
creating, by a messaging application in a first user device of the one or more user devices, a text message including one or more of the first or second logo icons with embedded functionality in a line of text of the text message;
displaying, by the messaging application in the first user device of the one or more user devices, at least one of an option bar or a user interface with one or more selectable embedded functionalities;
receiving, by the messaging application in the first user device of the one or more user devices, a selection of a functionality from one or more selectable embedded functionalities displayed in the at least one of the option bar or the user interface;
embedding, by the messaging application in the first user device of the one or more user devices, the selected functionality in the first or second one or more logo icons with embedded functionality included in the text message;
sending, by the messaging application in the first user device of the one or more user devices, the text message including the first or second one or more logo icons with embedded functionality;
receiving, by a messaging application in a second user device of the one or more user devices, the text message including the first or second one or more logo icons with embedded functionality; and
activating, by the messaging application in the second user device of the one or more user devices, the first or second one or more logo icons with embedded functionality without leaving the messaging application in the second user device.

10. The non-transitory program storage device of claim 9, wherein the first or second one or more logo icons with embedded functionality include an image of a company logo.

11. The non-transitory program storage device of claim 9, wherein the messaging application includes at least one of a virtual keyboard or a user interface having one or more logo icons with embedded functionality.

12. The non-transitory program storage device of claim 11, wherein the one or more logo icons with embedded functionality are categorized by brands in the at least one of a virtual keyboard or a user interface.

13. The non-transitory program storage device of claim 9, wherein the first or second one or more logo icons with embedded functionality include one or more hyperlinks.

14. The non-transitory program storage device of claim 9, wherein the first or second one or more logo icons with embedded functionality include one or more application program interfaces.

15. The non-transitory program storage device of claim 9, wherein the first or second one or more logo icons with embedded functionality include an image of a person.

16. The non-transitory program storage device of claim 9, wherein the first or second one or more logo icons with embedded functionality are selected from a predictive texting function.

17. The non-transitory program storage device of claim 9, wherein the at least one of the option bar or the user interface includes GPS or maps option that, when selected, uses a current location of the first user device to find the closest locations for a selected logo icon.

18. A non-transitory program storage device readable by a machine, the non-transitory storage device comprising instructions executable by at least one processor of the machine to perform a method for communicating text messages having one or more logo icons with embedded functionality, the method comprising the steps of:

dynamically requesting, by a messaging application in a user device, to create a first one or more logo icons with embedded functionality in a server coupled to a communication network;

dynamically requesting, by the messaging application in the user device, to add a second one or more logo icons with embedded functionality in the server;

downloading, by the messaging application in the user device, the first or second one or more logo icons with embedded functionality from the server to the user device;

creating, by the messaging application in the user device, a text message including the first or second one or more of the one or more logo icons with embedded functionality in a line of text of the text message;

displaying, by the messaging application in the user device, at least one of an option bar or a user interface with one or more selectable embedded functionalities;

receiving, by the messaging application in the user device, a selection of a functionality from the one or more selectable embedded functionalities displayed in the at least one of an option bar or a user interface;

embedding, by the messaging application in the user device, the selected functionality in the first or second one or more logo icons with embedded functionality included in the text message; and sending, by the messaging application in the user device, the text message including the first or second one or more logo icons with embedded functionality.

* * * * *